US011770486B2

(12) United States Patent
Kuno

(10) Patent No.: US 11,770,486 B2
(45) Date of Patent: Sep. 26, 2023

(54) STORAGE MEDIUM, INFORMATION PROCESSING APPARATUS, AND CONTROL METHOD OF INFORMATION PROCESSING APPARATUS

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/837,321

(22) Filed: Jun. 10, 2022

(65) Prior Publication Data
US 2022/0400183 A1 Dec. 15, 2022

(30) Foreign Application Priority Data
Jun. 11, 2021 (JP) .................. 2021-097782

(51) Int. Cl.
*H04N 1/00* (2006.01)
(52) U.S. Cl.
CPC ....... *H04N 1/00615* (2013.01); *H04N 1/0079* (2013.01); *H04N 1/00411* (2013.01); *H04N 1/00708* (2013.01)
(58) Field of Classification Search
CPC ........... H04N 1/00411; H04N 1/00615; H04N 1/00708; H04N 1/0079; H04N 1/393; H04N 1/00846; H04N 1/0402; H04N 1/32144; H04N 1/00442; H04N 1/00453; H04N 1/00458; H04N 1/00461; H04N 1/3935; H04N 5/76; H04N 5/91; H04N 9/7921; H04N 9/8205; H04N 1/00212; H04N 2201/0094; G06F 40/143; G06F 16/54; G06F 3/1423; G06F 40/103; G06F 40/131; G06F 16/56; G06F 16/583; G06F 16/5838; G06F 16/9566; G06F 3/0481; G06F 3/12; G06F 3/1204; G06F 3/1246; G06F 3/1288; G06F 9/542; G06T 11/60; G09G 2340/0414; G09G 2340/0421; G09G 2340/0464; G09G 2370/04; G09G 2370/042; G09G 5/006; G09G 5/14;
(Continued)

(56) References Cited

U.S. PATENT DOCUMENTS 9,565,053 B2 * 2/2017 Kadota ................. G06F 3/1236
9,699,334 B2 * 7/2017 Yoshimi ........... H04N 5/232933
(Continued)

FOREIGN PATENT DOCUMENTS

JP H09-120236 A 5/1997

*Primary Examiner* — Negussie Worku
(74) *Attorney, Agent, or Firm* — Venable LLP

(57) ABSTRACT

An object of the present disclosure is to present a document placement position more simply. A program for causing a computer of an information processing apparatus that causes an image processing apparatus to perform document scan processing to function as: a creation unit configured to create, based on first information relating to a document table of the image processing apparatus, second information indicating a position of a scan origin on the document table, and third information indicating a document size designated by a user, a GUI screen including information for guiding a position at which the document is placed on the document table; and a display control unit configured to cause a display unit to display the created GUI screen.

14 Claims, 47 Drawing Sheets

(58) Field of Classification Search
CPC ....... H04L 51/066; H04L 67/75; H04L 51/18; H04L 51/42; G06Q 10/10; G06Q 10/107
USPC ....................................................... 358/474
See application file for complete search history.

(56) References Cited

U.S. PATENT DOCUMENTS

| | | | |
|---|---|---|---|
| 10,951,780 B2* | 3/2021 | Yamauchi | H04N 1/00663 |
| 2003/0025954 A1* | 2/2003 | Takano | H04N 1/4055 |
| | | | 358/3.06 |
| 2006/0164675 A1* | 7/2006 | Yamada | H04N 1/32657 |
| | | | 358/1.15 |
| 2007/0016423 A1* | 1/2007 | Aizawa | H04N 1/00403 |
| | | | 704/260 |
| 2007/0052685 A1* | 3/2007 | Wakai | G06F 9/451 |
| | | | 715/764 |
| 2010/0119250 A1* | 5/2010 | Itoh | G06F 3/0488 |
| | | | 345/173 |
| 2017/0289372 A1* | 10/2017 | Matsumoto | H04N 1/00307 |
| 2018/0034992 A1* | 2/2018 | Kadobayashi | H04N 1/00092 |
| 2018/0220010 A1* | 8/2018 | Hasegawa | H04N 1/21 |
| 2020/0174637 A1* | 6/2020 | Tokita | G06F 3/0482 |
| 2021/0244370 A1* | 8/2021 | Hamauzu | A61B 6/12 |
| 2021/0250461 A1* | 8/2021 | Takagi | H04N 1/00779 |
| 2021/0271350 A1* | 9/2021 | Sato | G06F 3/04842 |
| 2022/0201147 A1* | 6/2022 | Bindana | H04N 1/2038 |

* cited by examiner

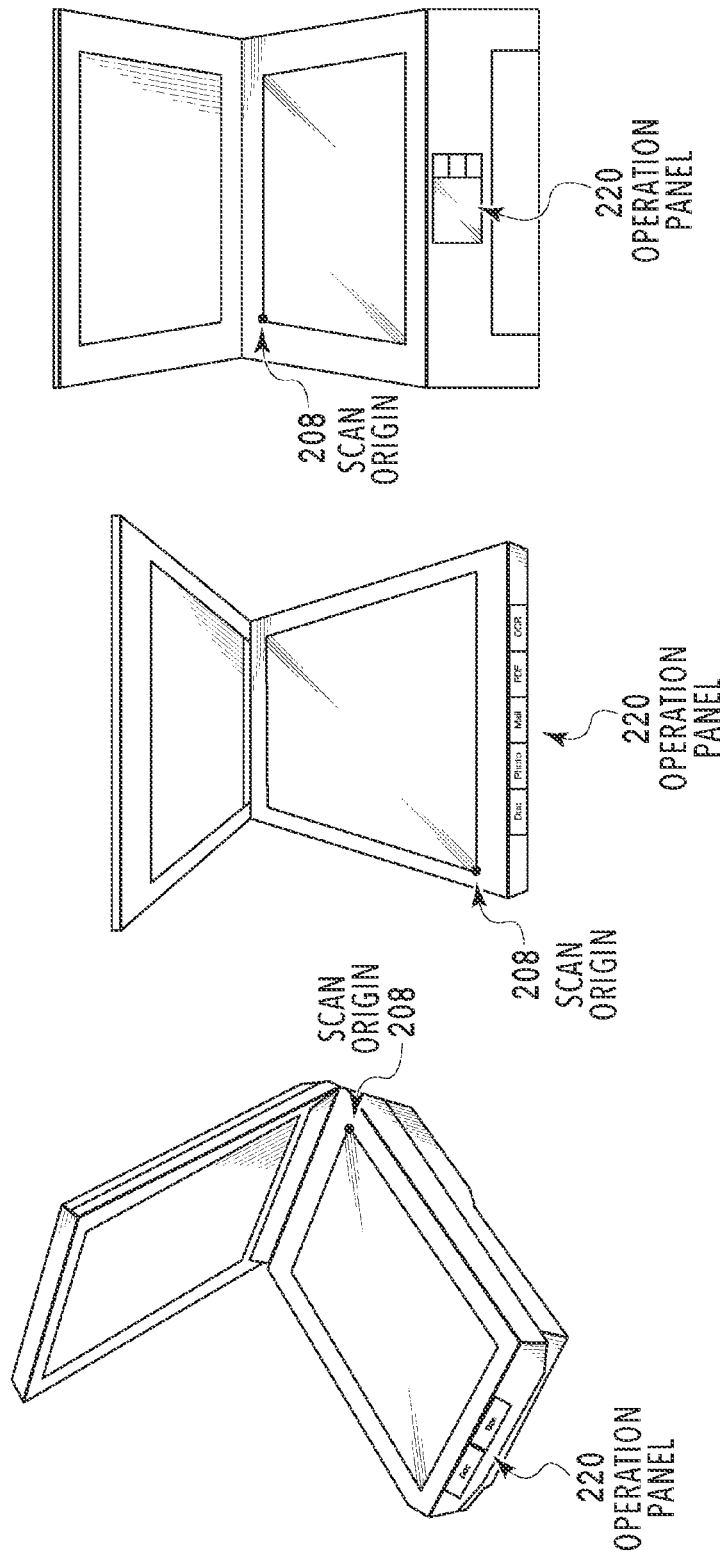

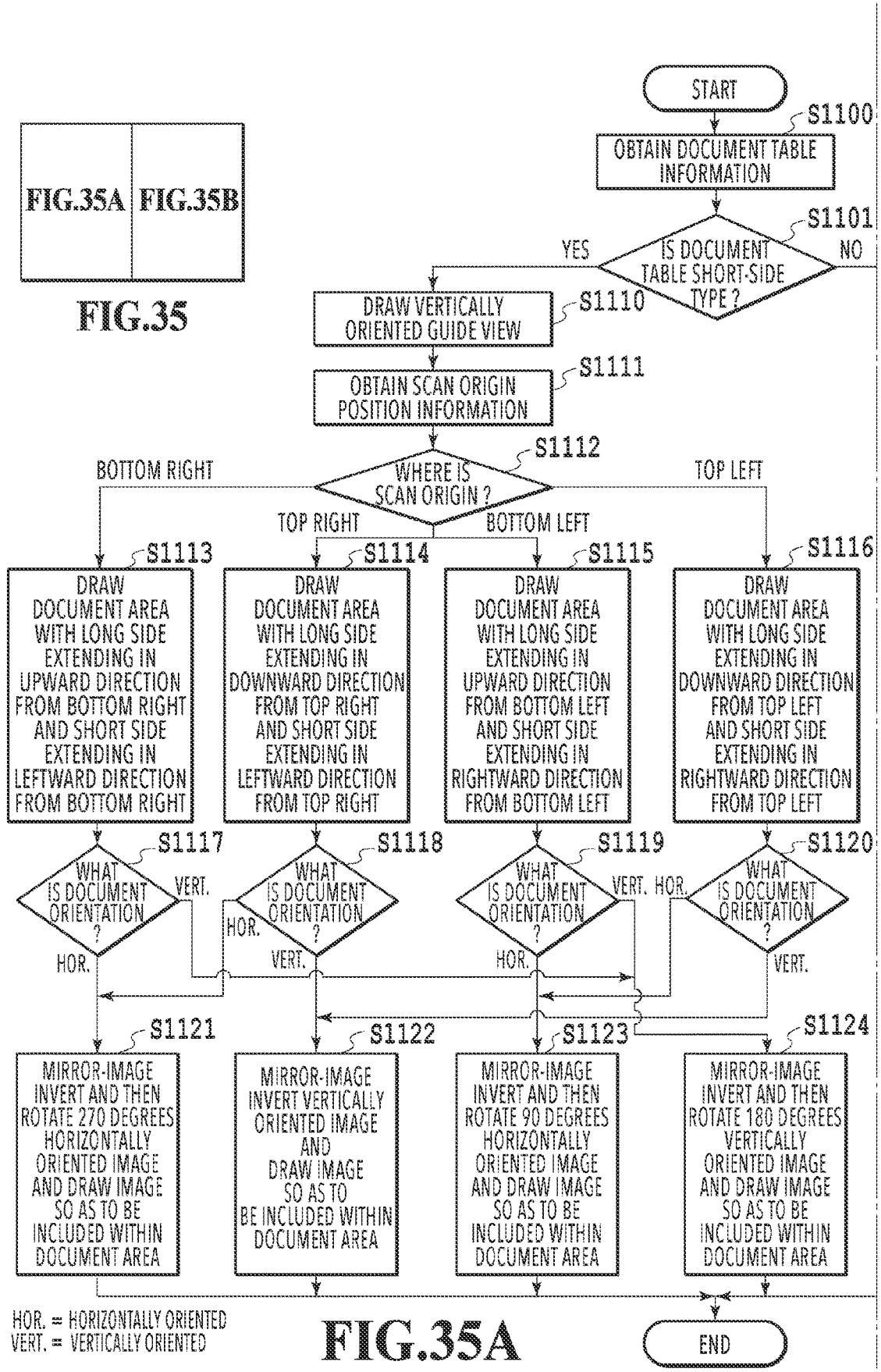

STORAGE MEDIUM, INFORMATION PROCESSING APPARATUS, AND CONTROL METHOD OF INFORMATION PROCESSING APPARATUS

BACKGROUND

Field

The present disclosure relates to a technique of a scanner in which a scan-target document is placed on a document table.

Description of the Related Art

Conventionally, as a method in which a module of an application module accesses an image processing apparatus, such as a scanner, and obtains size information on a scan-target document, there are three methods. Specifically, a method in which the automatic size detection function of the image processing apparatus is utilized, a method in which a user designates the document size by him/herself, and a method in which a low-resolution preview screen obtained by a fast scan is displayed and designation of area is performed while checking the image representing a document.

As the method in which the image processing apparatus performs the automatic size detection described previously, for example, there is a method in which an optical sensor that detects the presence/absence of a document is installed at a plurality of positions and based on the positional information of the sensor having detected a document, the document size is derived. However, this method requires a plurality of sensors to be prepared, and therefore, the manufacturing cost of the main body is increased and in a case where the number of sensors is decreased, the document size that can be detected is limited.

As another method, it is possible to obtain desired scanned image data by a user designating the document size, but in a case where the document is placed at a wrong position on the document table, it is not possible to obtain desired scanned image data. In order to deal with the problem that a user does not know how to place a document, a method is adopted in which marks corresponding to the document sizes, such as the A4 size and the letter size, are attached to the edge of the document table. However, because of the reason that it is not possible to attach marks of the sizes close to each other, and the like, it is difficult to attach all the kinds of mark of the document sizes.

Further, in a case where copying is the object, it is only required for the printed results themselves to be rotated physically, and therefore, the orientation of the document at the time of placing the document on the document table does not become problematic. However, in a case where scanning is the object, a display is produced sometimes on a display that is hard to rotate physically, and therefore, the orientation (face up, face down and the like) at the time of placing the document on the document table is important. However, by the above-described two methods, it is not possible to solve the problem relating to the orientation such as this.

Because of the reasons described above, a scanning method is adopted generally in which a preview screen is displayed at the time of scan, the document size is selectively determined so that appropriate scan results can be obtained while watching the image, and instructions to perform rotation and the like as needed are given for scanning. The preview screen for determining the document size is superior as a GUI because it is possible for a user to perform the operation intuitively, but the creation of the preview screen takes time. Consequently, in a case where the scan is performed continuously many times, repetition of the creation of the preview and the scan will be a load for a user.

Japanese Patent Laid-Open No. H9-120236 has disclosed a method of displaying the position at which the designated document size is scanned on the document table of the scanner as a method of arranging a document at a correct position without using a preview screen. This invention indicates that a liquid crystal panel is used as the document table and a document is placed at a portion in the transparent state on the liquid crystal panel. Due to this, it is possible for a user to know the position at which the document is placed.

SUMMARY

However, Japanese Patent Laid-Open No. H9-120236 requires a unit for visually presenting the position at which the document is placed to be provided on the scanner side. Consequently, the manufacturing cost of the scanner main body is increased.

Consequently, in view of the above-described problem, an object of one embodiment of the present invention is to present the position at which a document is placed with a simpler configuration.

One embodiment of the present invention is a non-transitory computer readable storage medium storing a program for causing a computer of an information processing apparatus that causes an image processing apparatus to perform document scan processing to function as: a creation unit configured to create, based on first information relating to a document table of the image processing apparatus, second information indicating a position of a scan origin on the document table, and third information indicating a document size designated by a user, a GUI screen including information for guiding a position at which the document is placed on the document table; and a display control unit configured to cause a display unit to display the created GUI screen.

Further features of the present invention will become apparent from the following description of exemplary embodiments with reference to the attached drawings.

BRIEF DESCRIPTION OF THE DRAWINGS

FIG. 7A to FIG. 7C are each a diagram showing a scanner origin that is different for a different scanner;

FIG. 35 is a diagram showing the relationship of FIG. 35A and FIG. 35B;

FIG. 35A and FIG. 35B indicate a flowchart of guide view display processing;

DESCRIPTION OF THE EMBODIMENTS

In the following, with reference to the attached drawings, preferred embodiments are explained in detail. The following embodiments are not intended to limit the invention relating to the scope of the claims. Further, all combinations of features explained in the following embodiments are not necessarily indispensable as the solution.

First Embodiment

<System Configuration>

Figure 1:
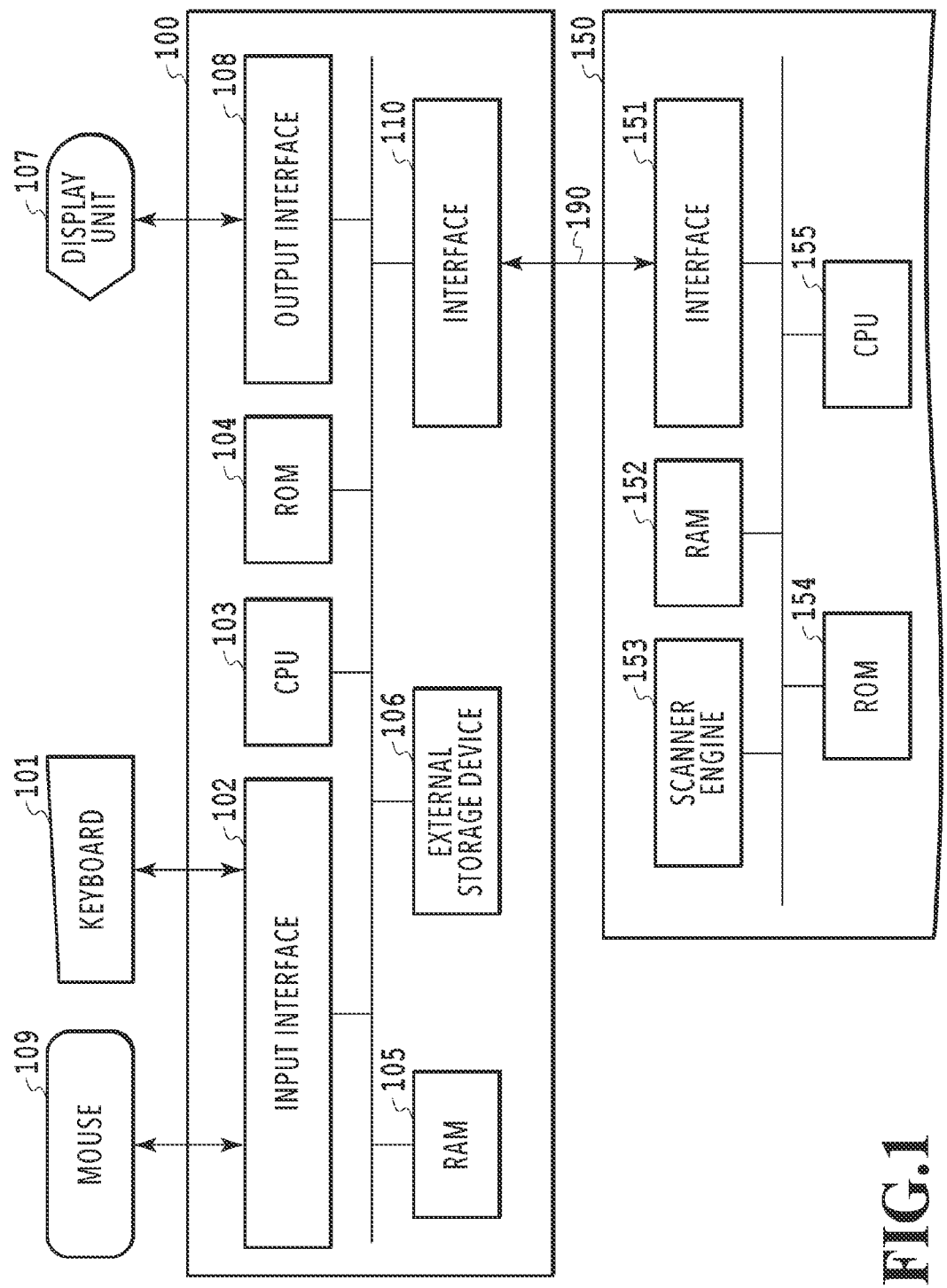
FIG. 1 is a block diagram showing a configuration of a system.

In the following, the configuration of a system in the present embodiment is explained by using FIG. 1. As shown in FIG. 1, the system in the present embodiment has an information processing apparatus 100 and an image processing apparatus 150.

The information processing apparatus 100 is a computer having an input interface 102, a CPU 103, a ROM 104, a RAM 105, an external storage device 106, an output interface 108, and an interface 110. The CPU 103 performs control (display control and the like) of the entire information processing apparatus 100. Further, the information processing apparatus 100 is connected with a keyboard 101 and a mouse 109 via the input interface 102 and also connected with a display unit 107 via the output interface 108.

The interface 110 is connected with an interface 151 of the image processing apparatus 150, to be described later, via a cable 190. In a case where the interface 110 is a network interface, the cable 190 is a network cable. Further, in a case where the interface 110 is a USB interface, the cable 190 is a USB cable. Furthermore, in a case where the interface 110 is WiFi (wireless LAN), the cable 190 does not exist physically and radio waves play the role of the cable 190.

In the ROM 104, initialization programs are stored. Onto the RAM 105, various programs stored in the external storage device 106 are loaded, and so on, and the RAM 105 is used as a work memory. In the external storage device 106, the operating system (in the following, described as OS), an application program (in the following, described as application) 123, and other various kinds of data are stored.

The image processing apparatus 150 has the interface 151, a RAM 152, a scanner engine 153, a ROM 154, and a CPU 155. In the present embodiment, as the image processing apparatus 150, specifically, a scanner or the like is supposed. The interface 151 is connected with the interface 110 of the information processing apparatus 100 via the cable 190. The RAM 152 is used as a main memory and a work memory of the CPU 155. Further, in the RAM 152, various kinds of data for processing a scan job received by the image processing apparatus 150 are stored temporarily.

The scanner engine 153 performs a scan based on the scan job stored in the RAM 152. The scanner 153 includes an optical sensor for scanning a document, a motor for driving a sensor, and the like. In the present embodiment, the processing is divided and allocated to the information processing apparatus 100 and the image processing apparatus 150 as described above, but this is merely exemplary. The present embodiment is not limited to this aspect in particular in which the processing is divided and allocated as described above and another aspect may be accepted.

<Flow of Application Calling Scanner Engine>

Figure 2:
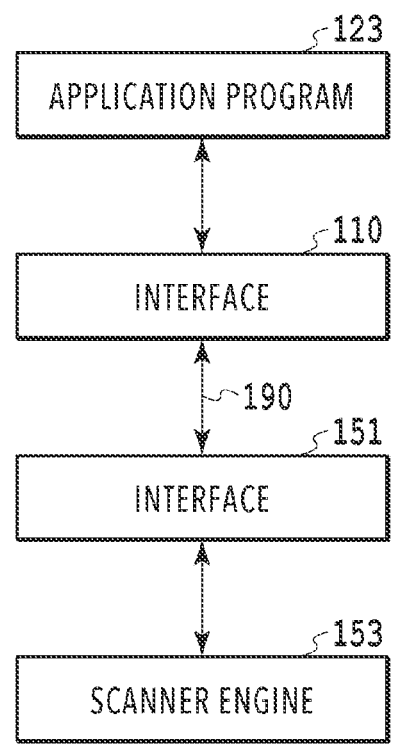
FIG. 2 is a diagram explaining a call of a scanner engine by an application program.

FIG. 2 is a diagram showing a call of the scanner engine 153 of the image processing apparatus 150 by the application 123 that runs on the information processing apparatus 100. A module that is implemented by the application 123 transmits instructions or a request for the scanner engine 153 to the interface 110. The interface 110 transfers the instructions or the request from the application 123 to the interface 151. The instructions or the request is transmitted via the cable 190 and the interface 151 receives the transmitted instructions or the request and the scanner engine 153 is called. The scanner engine 153 performs processing, such as a scan, in accordance with the instructions or the request from the application 123.

The module that is implemented by the application transmits a request for information on the scanner (the size of the document table, the orientation in a case of the standard way of placement, the scan origin, the position of the document table cover, and the like) and instructions to actually perform a scan to the scanner engine. Further, in the present embodiment, a graphical user interface (in the following, described as GUI) screen that is presented to a user is created by the application 123 in the information processing apparatus 100, not in the image processing apparatus 150. The GUI screen created by the application 123 is displayed on the display unit 107 connected to the information processing apparatus 100.

<Structure of Scanner>

Figure 3A:
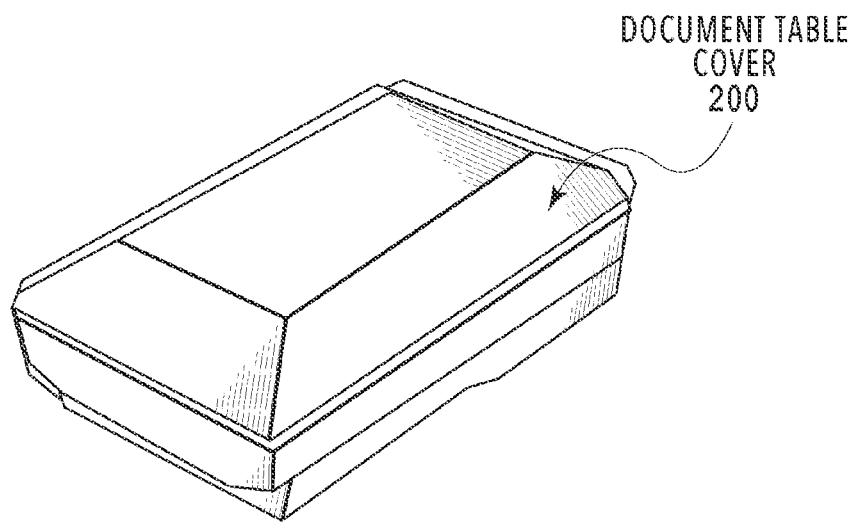
FIG. 3A and FIG. 3B are each a perspective diagram showing an outer appearance of a scanner.
Figure 3B:
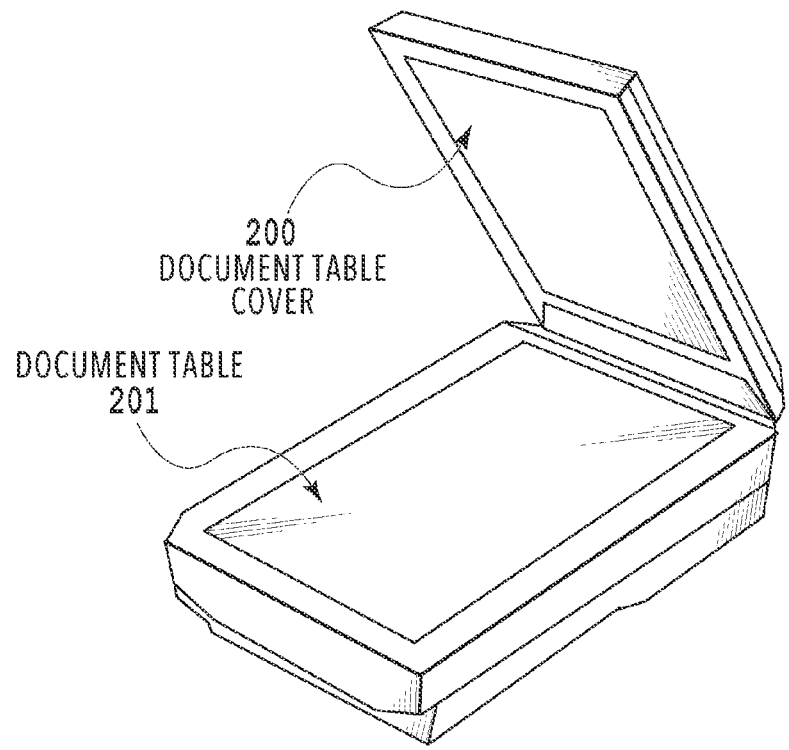

FIG. 3A and FIG. 3B are each a perspective diagram showing an example of an outer appearance of the scanner in the present embodiment. FIG. 3A shows the state where a document table cover 200 is closed and FIG. 3B shows the state where the document table cover 200 is open. A user sets a scan-target document by placing a document that the user desires to scan on a document table 201 and closing the document table cover 200. Closing the document table cover 200 is not mandatory, but by closing the document table cover 200 to press down the document, it is possible to improve the quality of the scanned image.

Figure 4:
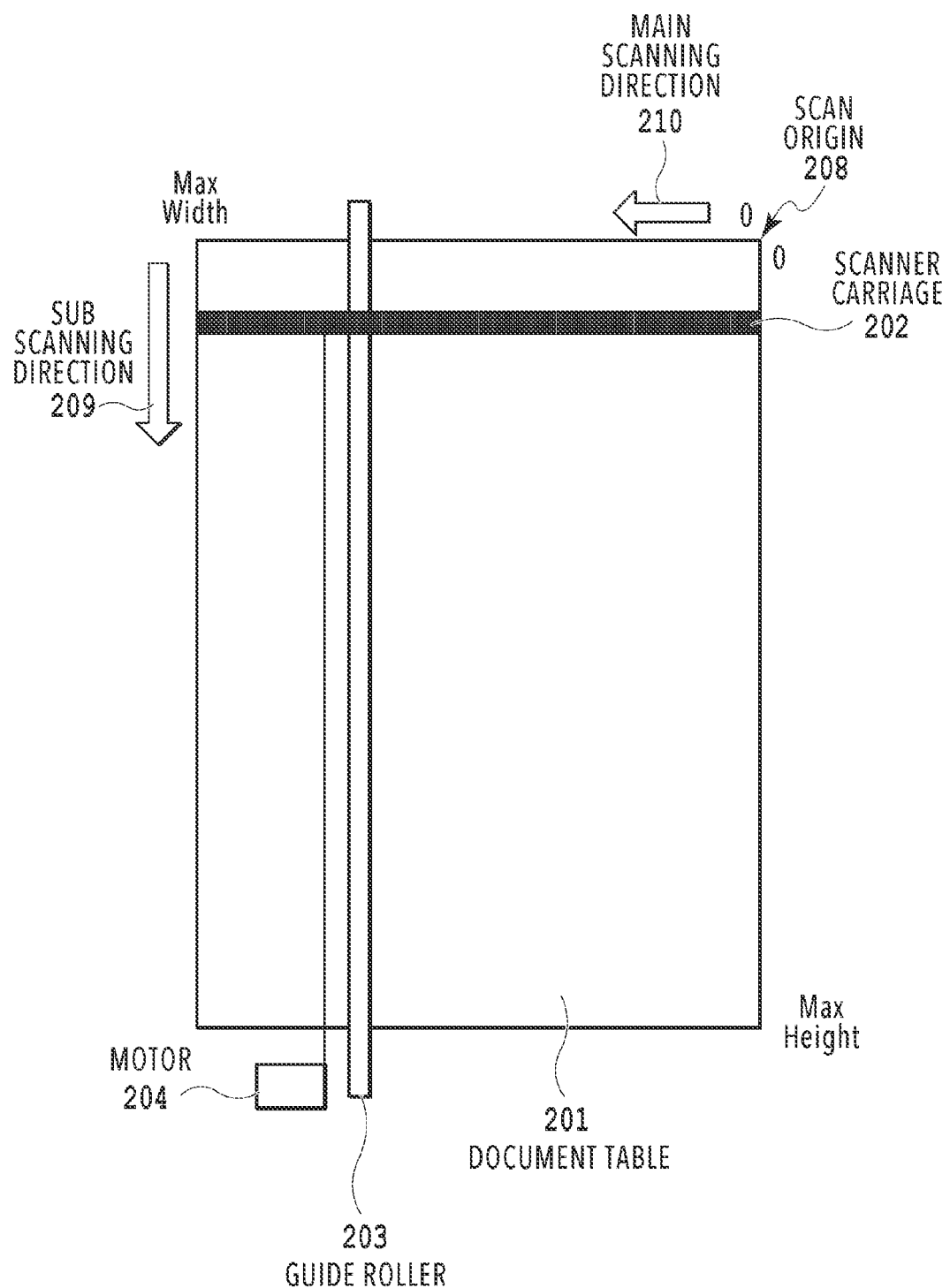
FIG. 4 is a schematic diagram in a case where a scanner is viewed from a bird's eye.

FIG. 4 is a schematic diagram in a case where the scanner in the present embodiment is viewed from a bird's eye. In the example shown in FIG. 4, a scan origin 208 is located at the top right and the document table 201 is vertically oriented. The scan in the main scanning direction is performed from right to left in FIG. 4 as shown by an arrow 210. Consequently, the coordinate at the rightmost end in the main scanning direction is 0 and at the leftmost end, the width reaches the maximum value. The scan in the main scanning direction in this example is performed by using a line sensor, and therefore, the sensor does not move actually in the main scanning direction. A carriage on which a line sensor is mounted is referred to as a scanner carriage 202. The scanner carriage 202 moves in the direction of an arrow 209 on the rail of a guide roller 203 by the drive of a motor 204. Due to this, the scan in the sub scanning direction is implemented.

Figure 5A:
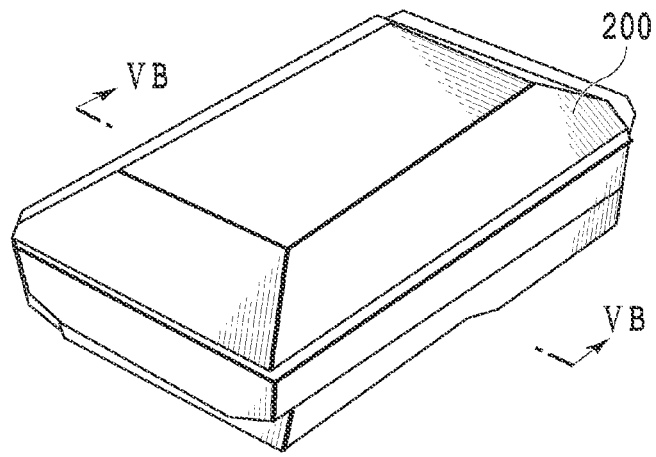
FIG. 5A and FIG. 5B are each a diagram showing a structure of a scanner.
Figure 5B:
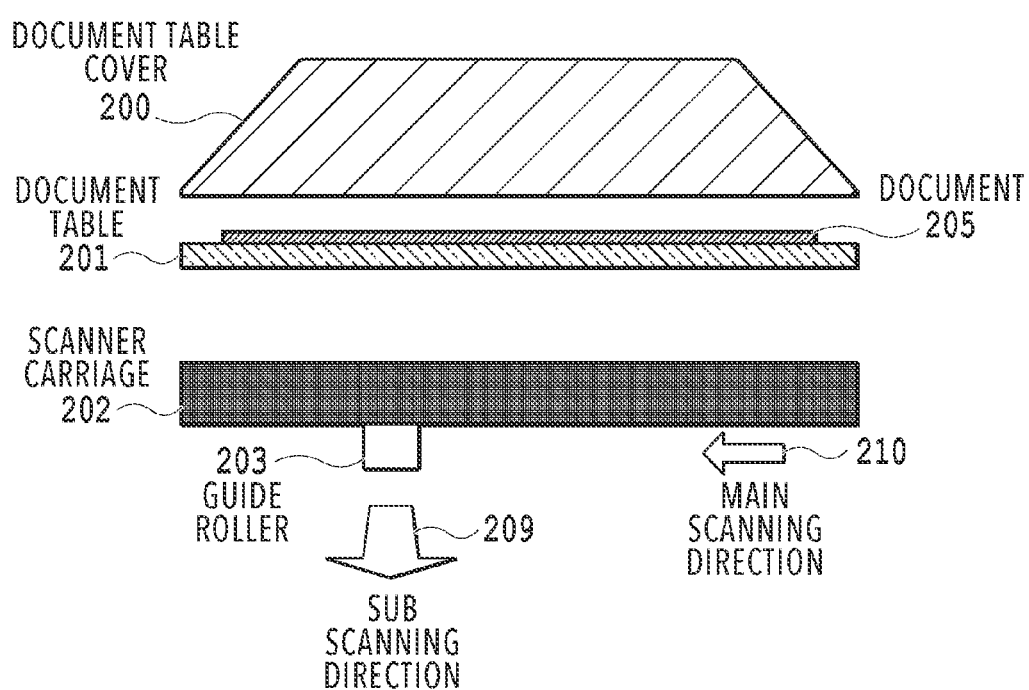

FIG. 5A and FIG. 5B are each a diagram showing the structure of the scanner in the present embodiment. FIG. 5A shows the state where the document table cover 200 is closed and FIG. 5B is a cross-sectional diagram along a section line VB-VB in FIG. 5A. A document 205 is placed on the glass of the document table 201 and pressed down by the document table cover 200. The scanner carriage 202 is located under the glass of the document table 201.

Figure 6A:
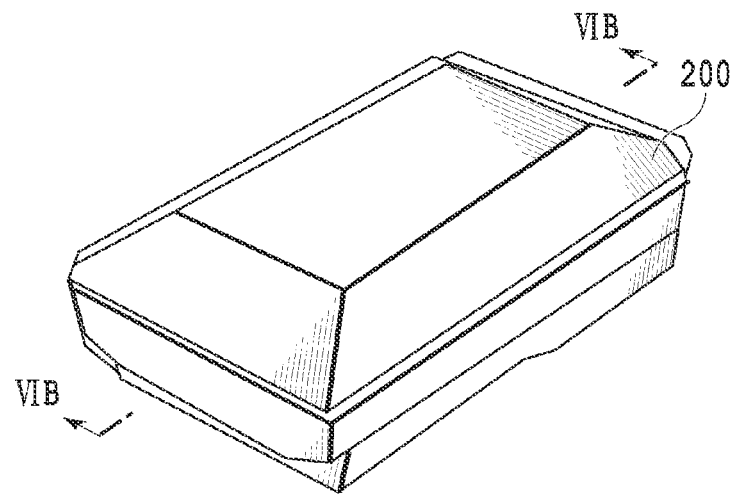
FIG. 6A and FIG. 6B are each a diagram showing a structure of a scanner.
Figure 6B:
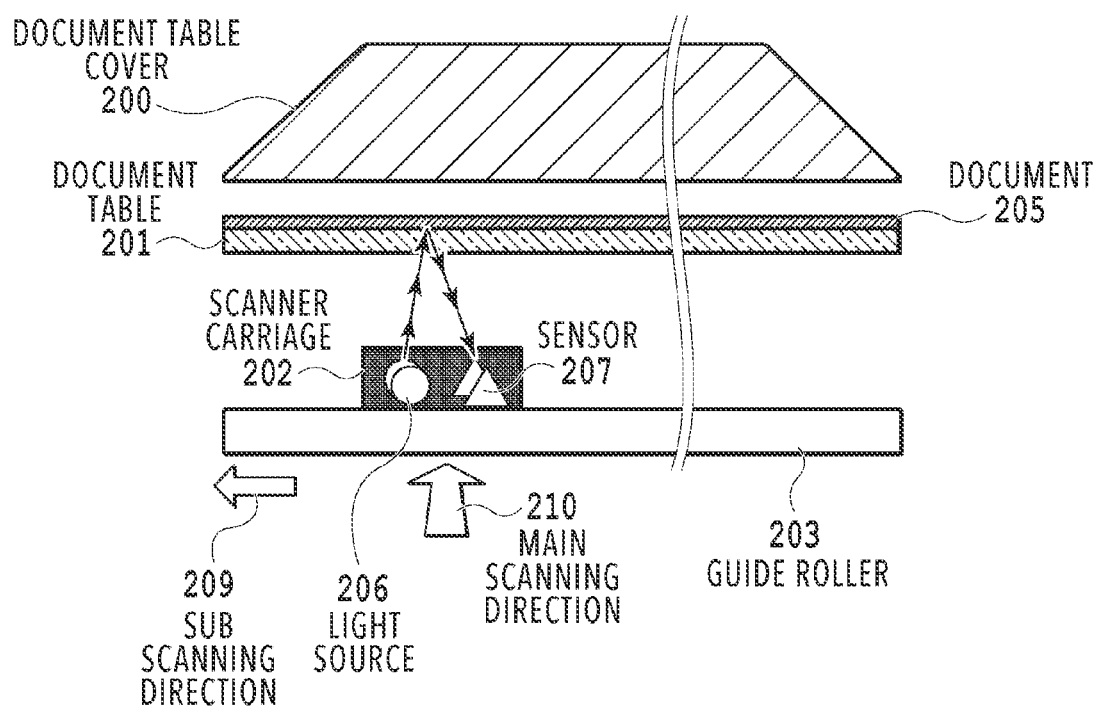

FIG. 6A and FIG. 6B are each a diagram showing the structure of the scanner in the present embodiment. FIG. 6A shows the state where the document table cover 200 is closed and FIG. 6B is a cross-sectional diagram along a section line VIB-VIB in FIG. 6A. The scanner carriage 202 is provided with a plurality of light sources 206 and sensors 207 corresponding to the resolution. Light emitted from the light source 206 passes through the glass of the document table 201 and hits the document 205 and the light having hit the document 205 is reflected and reaches the sensor 207. The sensor 207 detects the reflected light and reads the set document 205 by digitalization.

As shown in FIG. 6B, the sensor of the scanner is located under the document table, and therefore, a user places the document face down so that the surface to be canned faces the glass of the document table 201 (that is, the surface that is not scanned faces up). The document to be scanned is placed face down, and therefore, the image that is seen through from above is in the state of being mirror-image inverted.

FIG. 7A to FIG. 7C each show that the scan origin 208 from which a scan is started can exist at various positions. It is assumed that in each of FIG. 7A to FIG. 7C, the scanner is installed so that the side on which the operation panel is located is in front of a user to enable the user to perform the scan operation.

For the single function scanner (in the following, described as SFS), there are many designs in which the document table is vertically oriented in a case where the document table is viewed from a user who operates the SFS so that the document table is long in the depth direction and short in the width direction at the time of installation. By setting the horizontal width to the requisite minimum, it is possible to improve the convenience of installation. In order to implement the movement of the scanner carriage in the sub scanning direction from end to end of the document table, the scanner needs a space for storing the scanner carriage (in the following, described as storage space) in front of the reading start position. FIG. 7A shows a case where the storage space is provided on the back side viewed from the operation panel 220 and in this case, the scan origin is the top right. On the contrary, FIG. 7B shows a case where the storage space is provided on the side of the operation panel 220 and in this case, the scan origin is the bottom left.

FIG. 7C is a diagram showing the scan origin in the Multi Function Printer (in the following, described as MFP). The MFP has the function as a printer and needs a space in which the printer header can be stored at both ends in the main scanning direction (horizontal direction in FIG. 7C). On the other hand, a document or the like is fed in the rolled state, and therefore, the length in the depth direction may be less than the document size. Because of this, there are many designs in which the casing is horizontally oriented, whose length is great in the width direction viewed from a user (that is, in the main scanning direction). Then, in a case where the function as a scanner is added to the MFP, in many cases, the constituent parts of the scanner are installed in the horizontal direction to prevent the size in the depth direction from increasing. For example, in a case where the mechanism, such as the operation unit, is installed on the right side, the space in which the scanner carriage is stored is located on the left side. Consequently, as shown in FIG. 7C, the scan origin is the top left. As a matter of course, the structure shown here is an example. It may also be possible to appropriately change the relationship between the vertical width and the horizontal width of the document table and the storage location of the scanner carriage in accordance with another design policy aiming at improvement of usability and the like. The scan origin may be located at a variety of positions.

Figure 8:
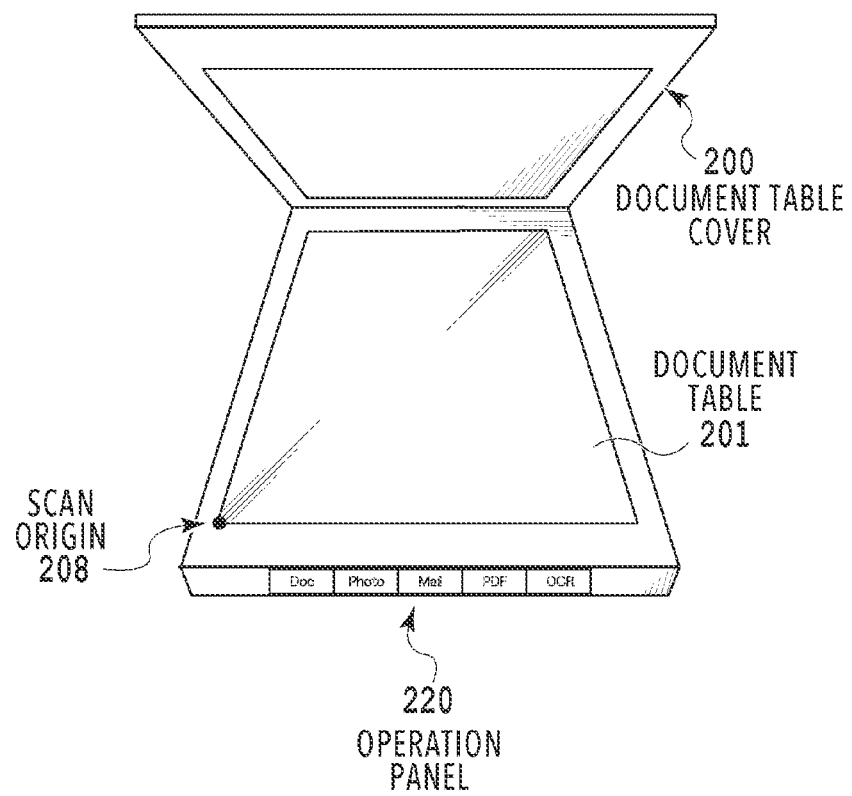
FIG. 8 is a bird's eye diagram of a scanner (SFS)

FIG. 8 shows the SFS whose document table is vertically oriented and whose scanner carriage storage location is on the front side. The scan origin 208 in this SFS is the bottom left of the document table 201 in a case where the operation panel 220 is located on the front side.

Figure 9:
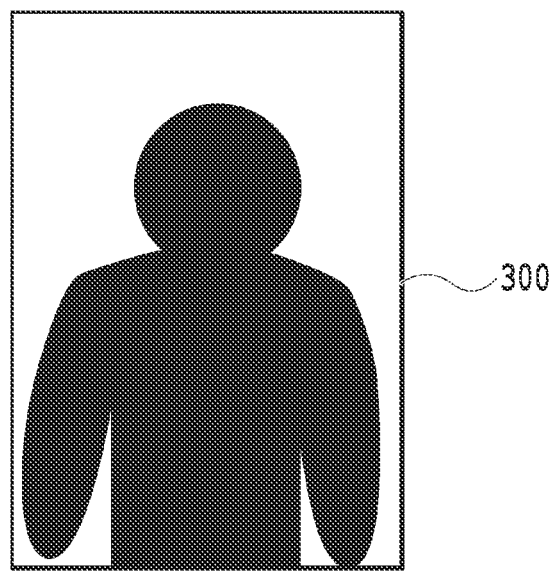
FIG. 9 is a diagram showing an L-size vertically oriented document.

FIG. 9 shows an example of a scan-target document. As shown schematically, the scan-target document is a photo 300 whose document size is L, whose document orientation is portrait (vertically oriented), and in which one person is captured.

Figure 10:
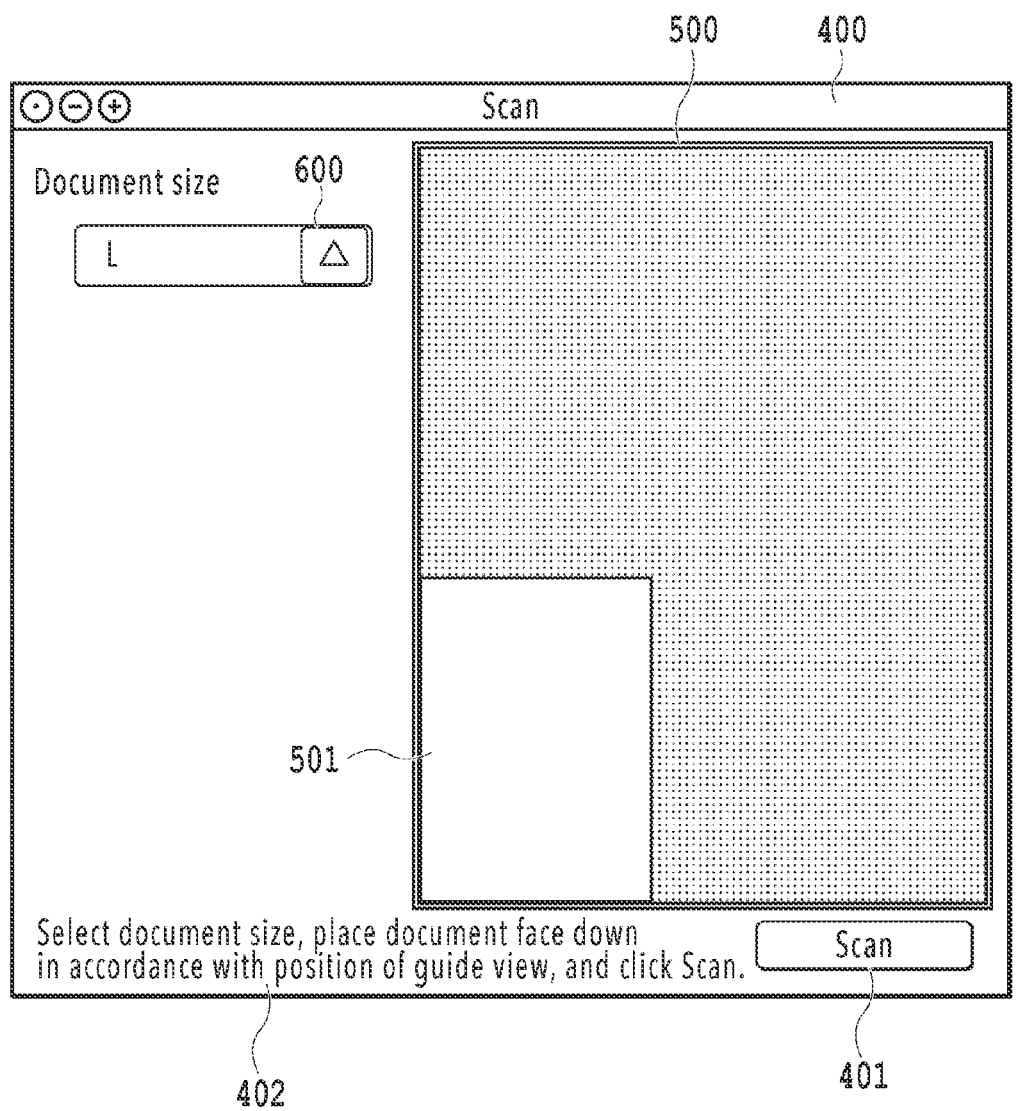
FIG. 10 is a scan setting GUI screen on which the L size is designated as a document size.

FIG. 10 shows a GUI screen as an example of a scan setting screen that is provided by the application 123, which enables a user to scan the document 300 shown in FIG. 9 without extra editing. First, a user designates the document size of the document 300. The designation of the document size is performed by a user selecting the document size name via a popup dialog 600. In a guide view 500, an image showing the entire surface of the document table (referred to as "document table image") is displayed. On the document table image, a document area 501 is displayed as an area (guide information) indicating the position at which the document in accordance with the document size name selected via the popup dialog 600 is to be placed and the document size.

Figure 11:
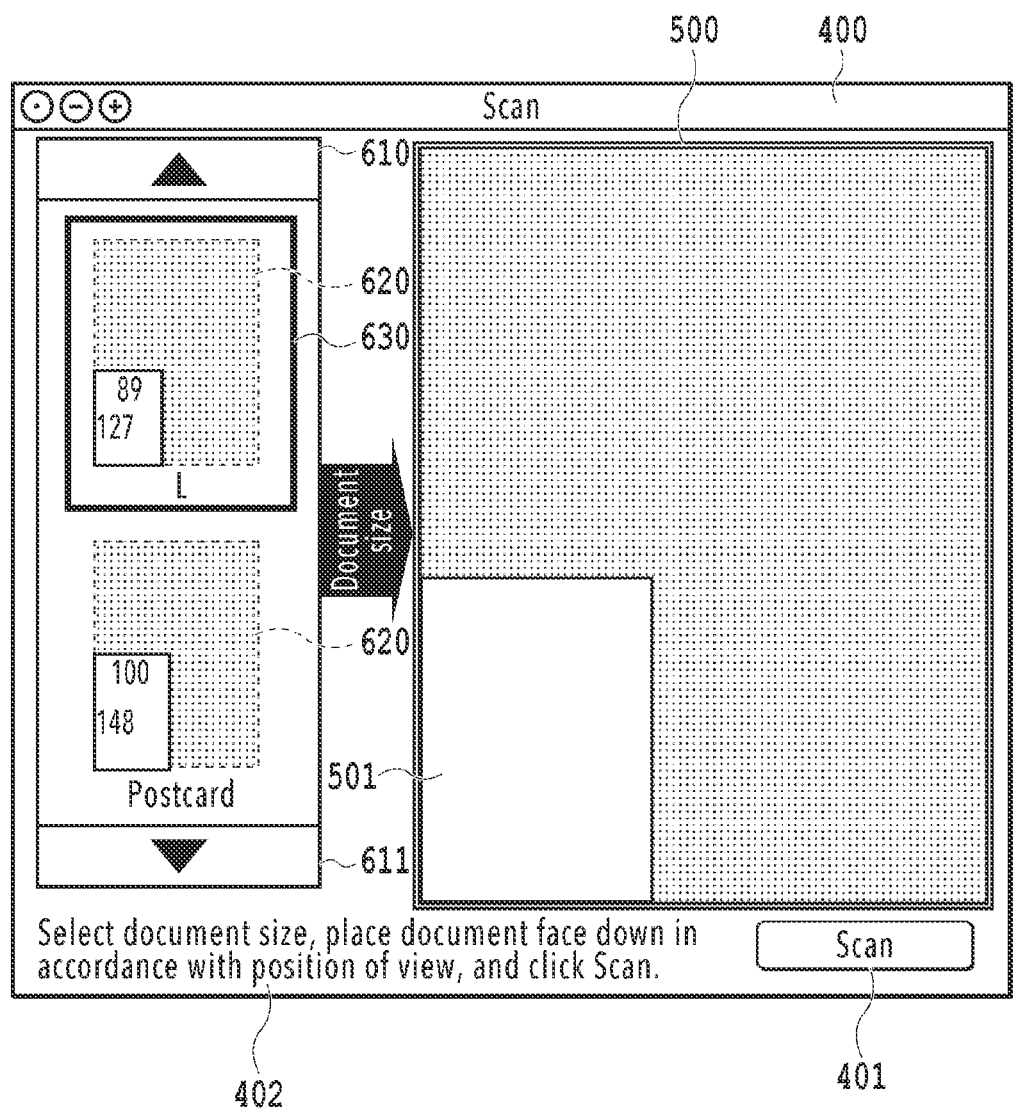
FIG. 11 is a scan setting GUI screen on which the L size is designated as a document size.

FIG. 11 shows a GUI screen as an example of a scan setting screen that is provided by the application 123, which is used at the time of a user selecting the document size while checking the image showing the document size and the position in a case where the document is placed on the document table. It is possible for a user to designate a desired document size by clicking the image corresponding to each document size. In the example shown in FIG. 11, the L size is selected. In order to indicate explicitly that the document size is selected, the image corresponding to the document size being selected is surrounded by a frame line 630. In a case where the document size a user desires to designate is not displayed, it is possible to display an image corresponding to another document size by pressing down an upward arrow button 610 or a downward arrow button 611.

Figure 12:
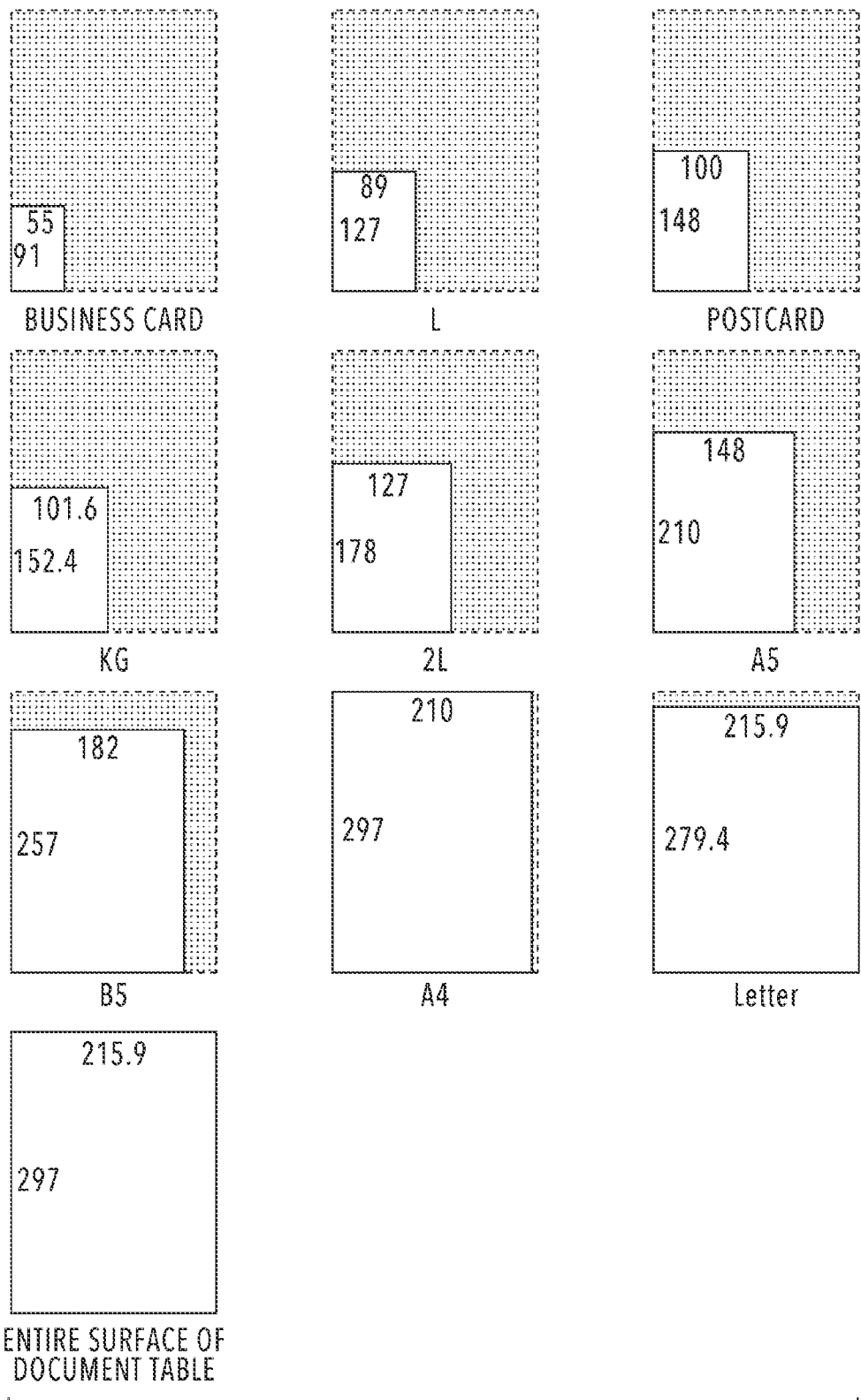
FIG. 12 is image diagrams of various document sizes.

FIG. 12 shows examples of specific contents that are presented as document sizes in FIG. 11. With an image showing the size of the entire surface of the document table being taken as the background, a document area indicating what is the size of the scan-target document. As a matter of course, it may also be possible to display the name of the document size as in FIG. 12 as information that is presented to a user and to display the value of the document size so that a user knows the actual size. The value of the document size is a value in units (for example, of mm, inch, and the like) designated by a user.

Figure 13:
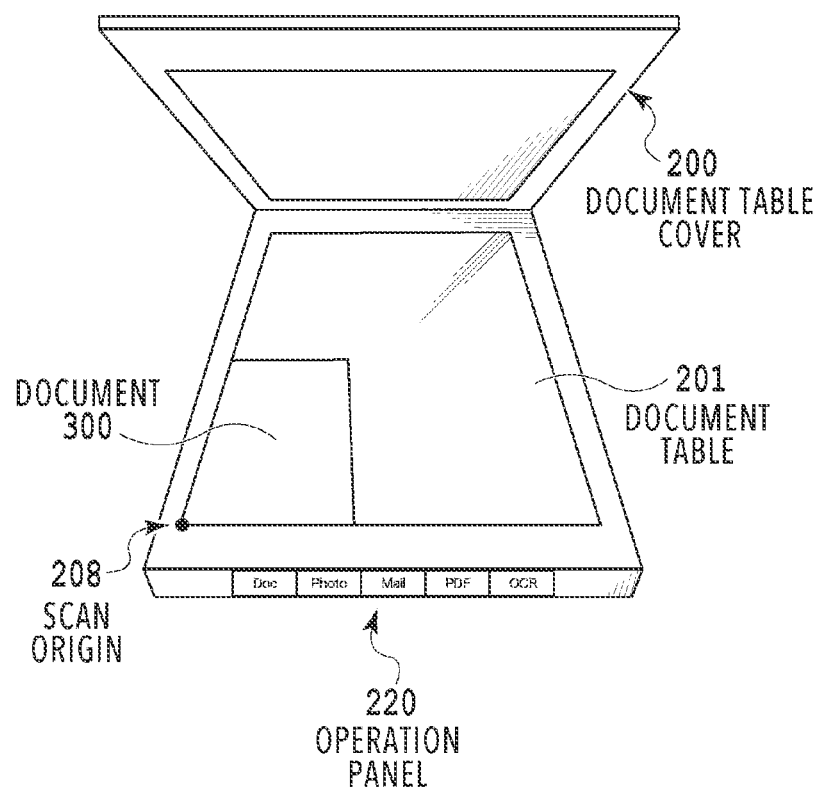
FIG. 13 is a bird's eye diagram of a scanner (SFS) on which an L-size document is placed.

FIG. 13 shows the state where a user actually places the document on the scanner with reference to the document area 501 in the guide view 500 shown in FIG. 10 or FIG. 11.

Figure 14:
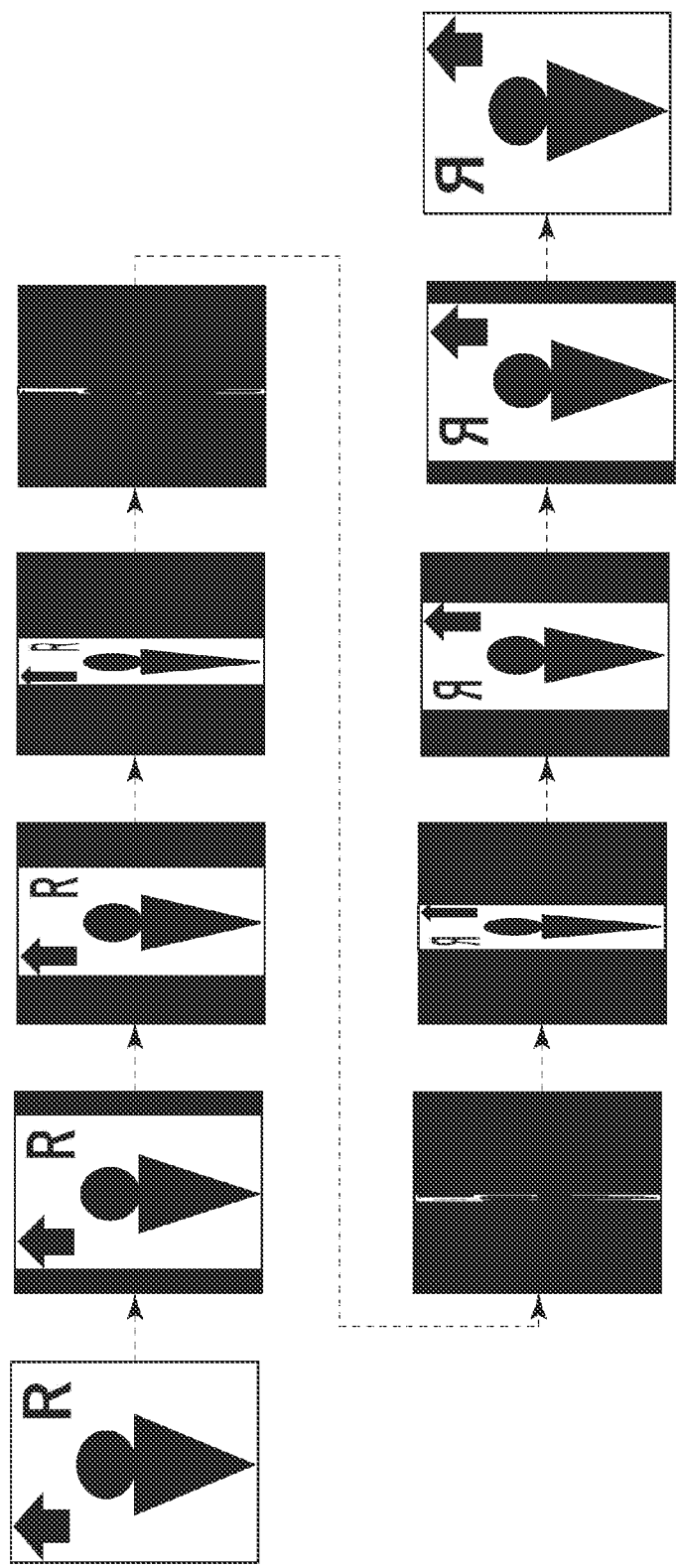
FIG. 14 is a diagram showing an animation prompting the reversion of a document.

FIG. 14 shows an example of an animation display prompting a user to place the document face down in the document area 501 in the guide view 500. This animation is created by the application 123. As shown in FIG. 10 and the like, in a scan window 400, an explanatory message, such as "place the document face down . . . ", is displayed but only by this message, it is difficult to understand this. Consequently, by displaying a still image by which a user understands that the document is placed face down in the document area 501, displaying the animation as in FIG. 14, and so on, it is indicated explicitly to a user that the document is placed face down.

Figure 15:
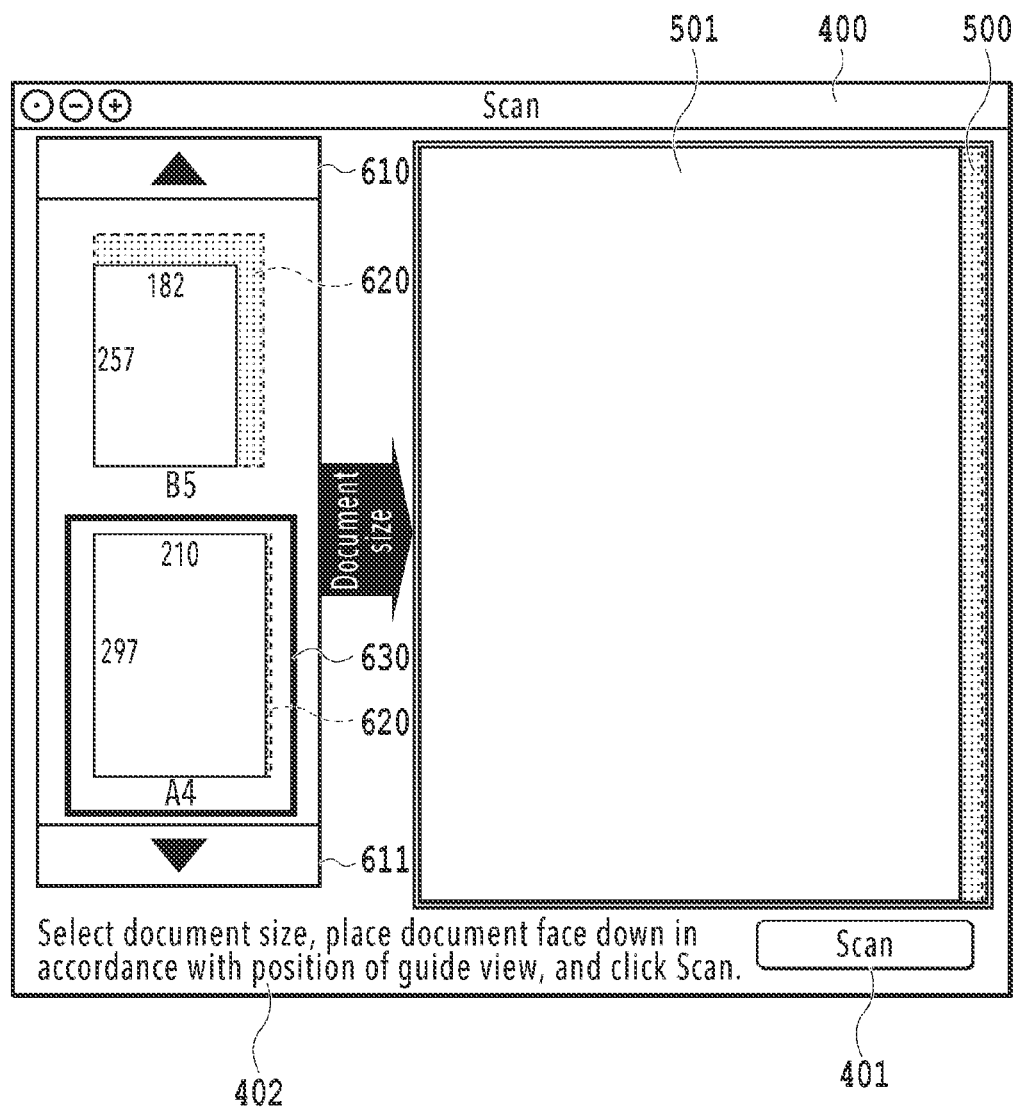
FIG. 15 is a scan setting GUI screen on which the A4 size is designated as a document size.

FIG. 15 shows the state where the image of the document size is scrolled by pressing down the upward arrow button 610 or the downward arrow button 611 and the image corresponding to the A4 size is displayed, and then the displayed image is selected. In a case where the image corresponding to the A4 size is selected by a user, the document area 501 as the area indicating the position at which the A4-size document is placed and the A4 size is displayed in the guide view 500.

Figure 16:
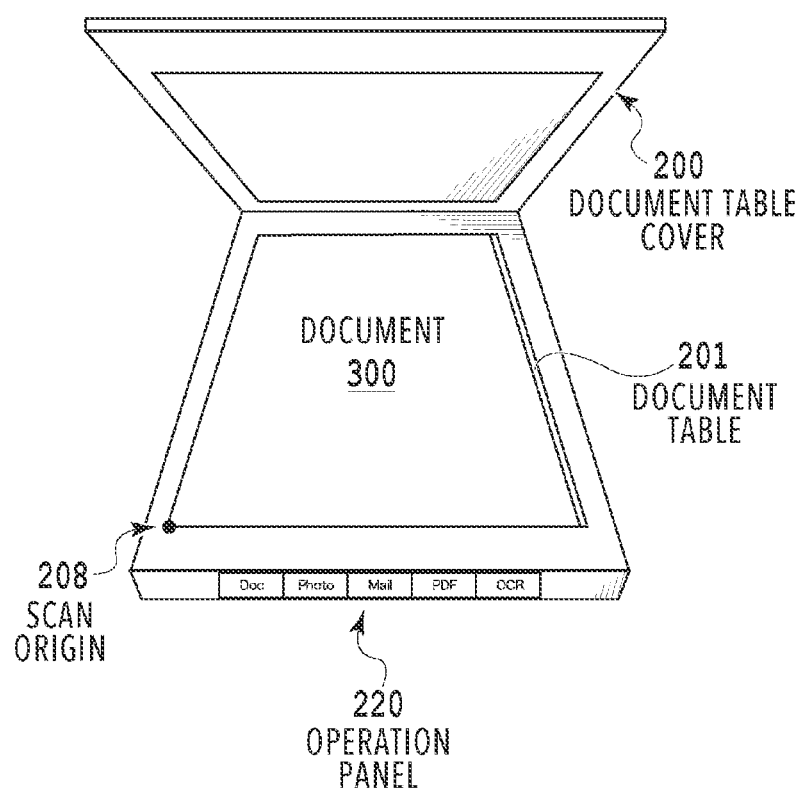
FIG. 16 is a bird's eye diagram of a scanner (SFS) on which an A4-size document is placed.

FIG. 16 shows the state where a user actually places the A4-size document 300 on the document table 201 of the scanner with reference to the document area 501 in the guide view 500 shown in FIG. 15. It is possible for a user to obtain the desired A4-size scanned image by pressing down a Scan button 401 in this state.

Figure 17:
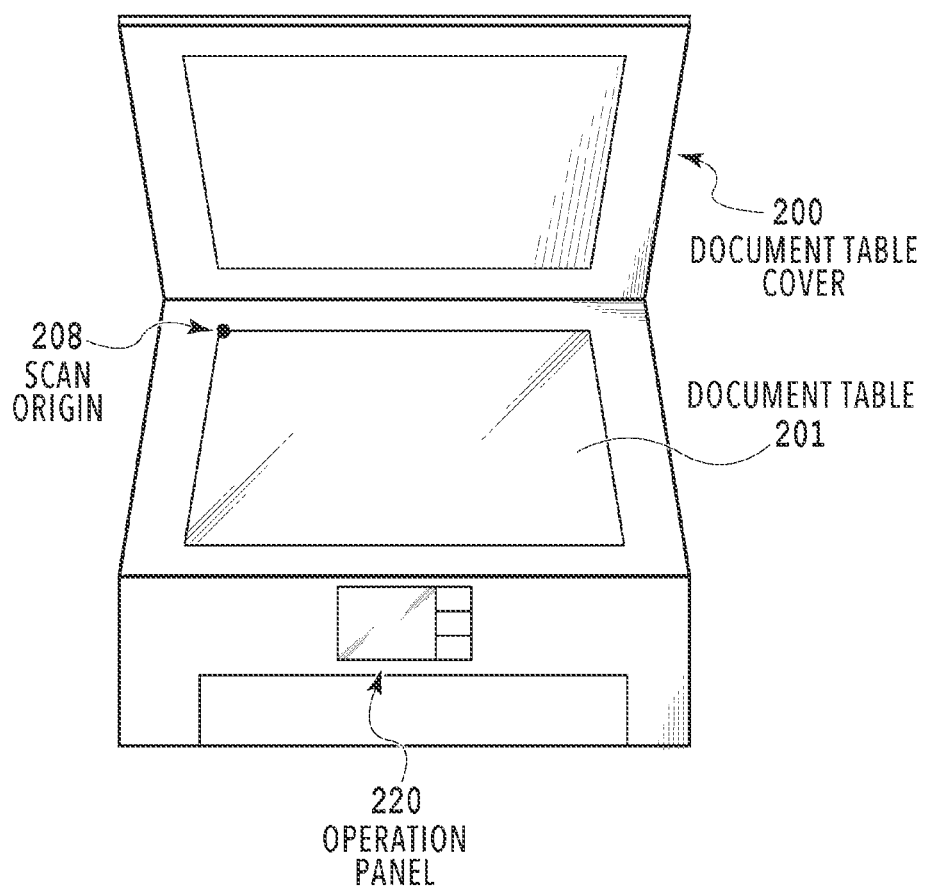
FIG. 17 is a bird's eye diagram of an MFP.

FIG. 17 shows an example of the MFP having the function as a scanner. In this MFP, the document table 201 is horizontally oriented and the reference scan origin 208 is located at the top left.

Figure 18:
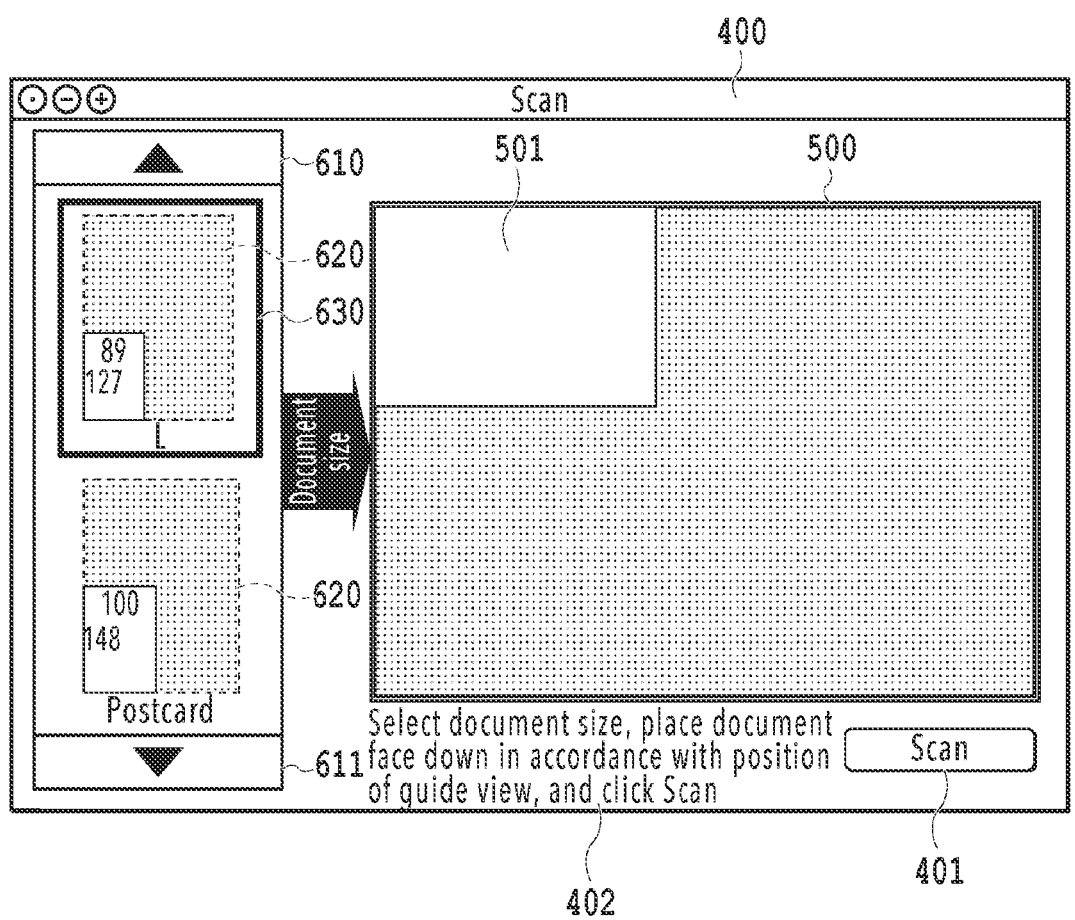
FIG. 18 is a GUI screen of an MFP.

FIG. 18 shows a GUI screen for performing scan setting in the MFP shown in FIG. 17. As shown schematically, the guide view 500 is displayed as a horizontally oriented view in accordance with the horizontally oriented document table 201. Further, the document area 501 corresponding to the L size is displayed at the top left of the guide view 500 so as to fit to the top-left scan origin 208.

Figure 19:
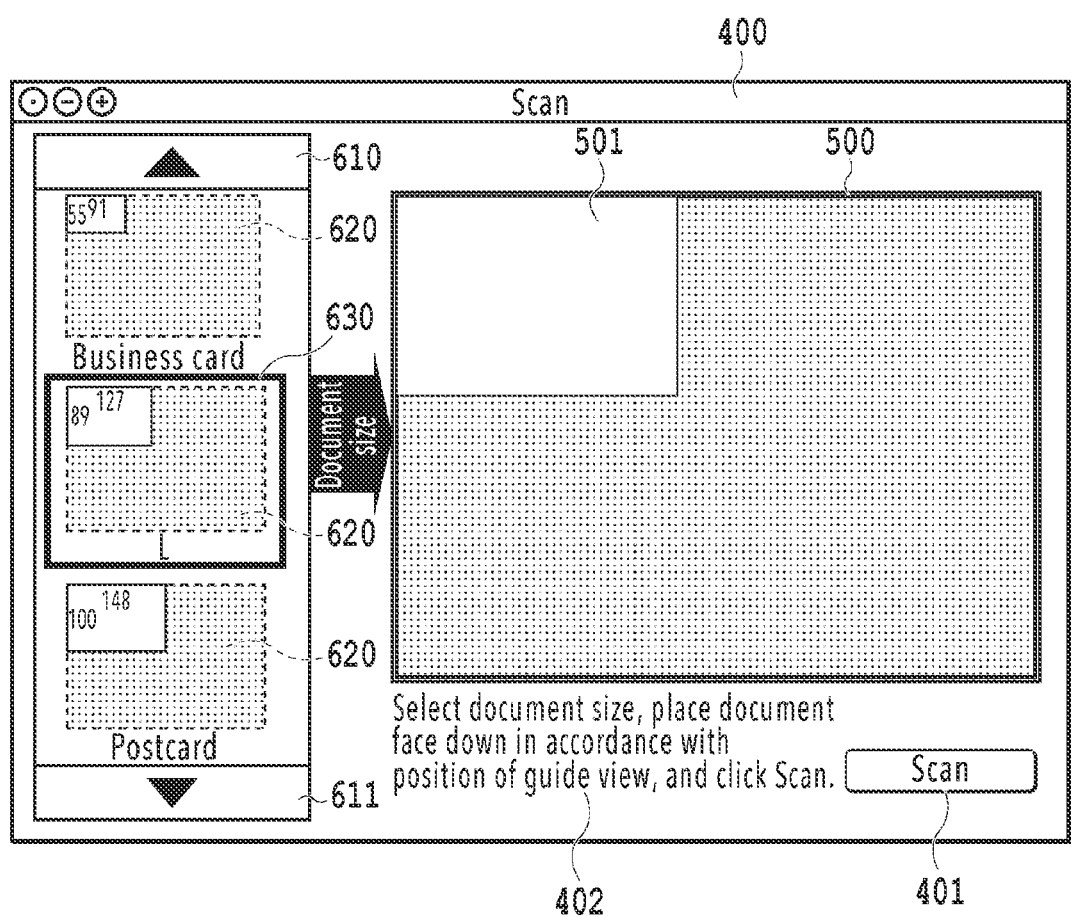
FIG. 19 is a GUI screen of an MFP.

FIG. 19 shows a GUI screen in a case where the relationship between the vertical width and the horizontal width of the document table 201 is applied to the document size image. FIG. 18 shows the document size image not based on the relationship between the vertical width and the horizontal width of the document table and the vertically oriented image is displayed as the document size image despite that the document table 201 is horizontally oriented. As shown in FIG. 19, it may also be possible to display the document size image based on the vertical width and the horizontal width of the document table 201 and the position of the scan origin, as in the case of the guide view 500. In this case, only by the document size image, the function of a guide view that guides a user is implemented. Consequently, as shown in FIG. 20, it may also be possible to display only the document size image for the selection of a user without displaying the guide view in the scan window 400.

Figure 20:
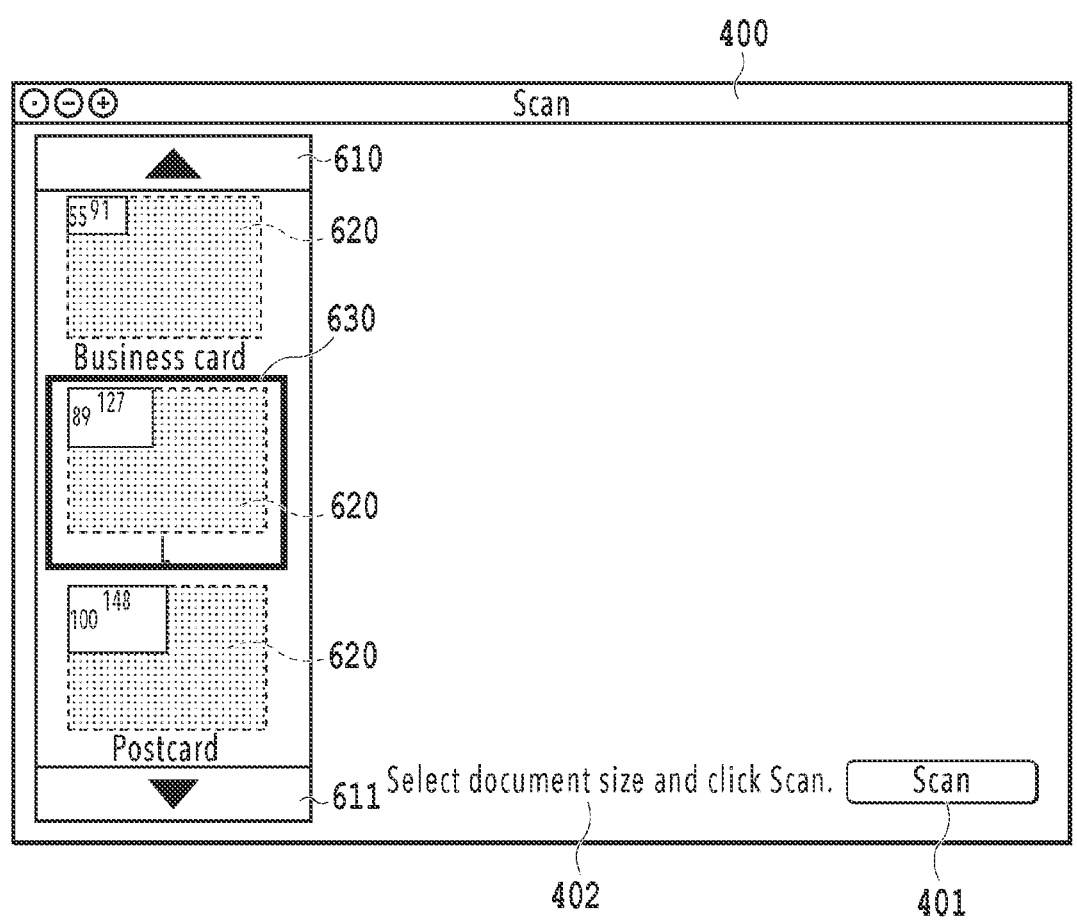
FIG. 20 is a GUI screen (guide view is not displayed) of an MFP.
Figure 21:
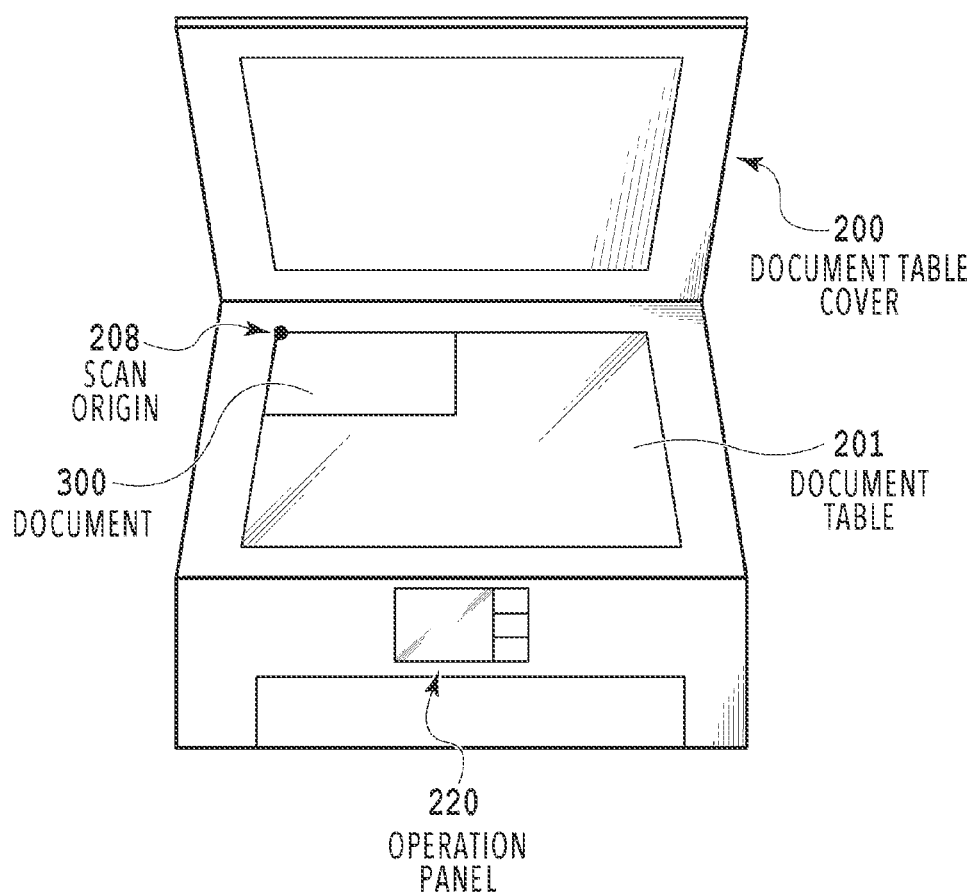
FIG. 21 is a bird's eye diagram of an MFP on which an L-size document is placed.

FIG. 21 shows the state where a user actually places the document 300 at the position of the document table shown on the GUI screen in FIG. 18 to FIG. 20. It is possible for a user to obtain the desired scanned image by pressing down the Scan button 401 in this state.

Figure 22A:
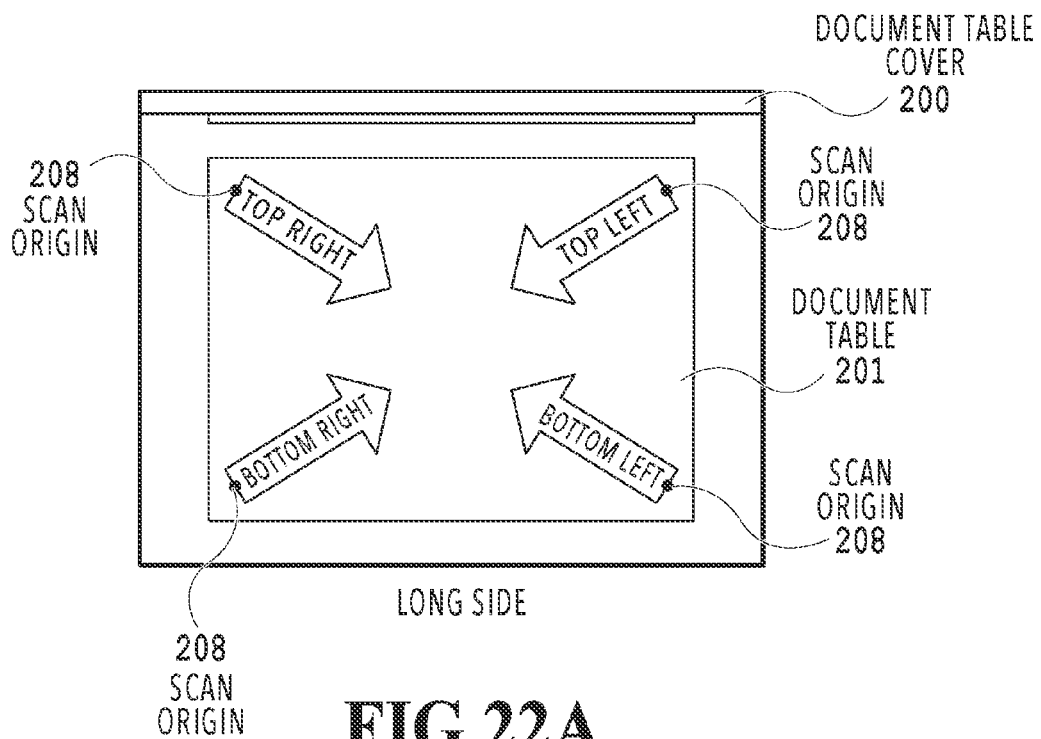
FIG. 22A and FIG. 22B are each a diagram showing the position that can be taken as the scan origin on the document table.
Figure 22B:
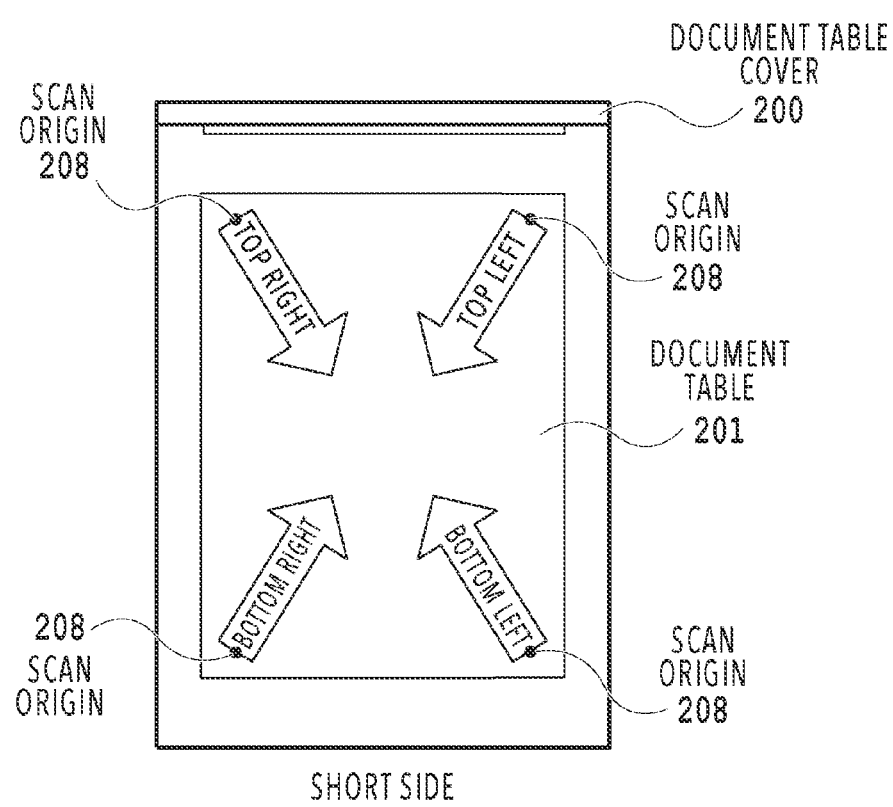

FIG. 22A and FIG. 22B each show scanner elements that affect the display of the guide view. Here, it is premised that the document table cover 200 is located on the back side. Whether the document table orientation is horizontally oriented (in the following, described as long-side type) or vertically oriented (in the following, described as short-side type) is taken as the determination reference of whether the image on the document table is displayed as a horizontally oriented image or as a vertically oriented image in the guide view. For each of the long-side type and the short-side type, which the document area is set from is determined in accordance with which corner of the document table 201 the scan origin 208 is located in.

Figure 23:
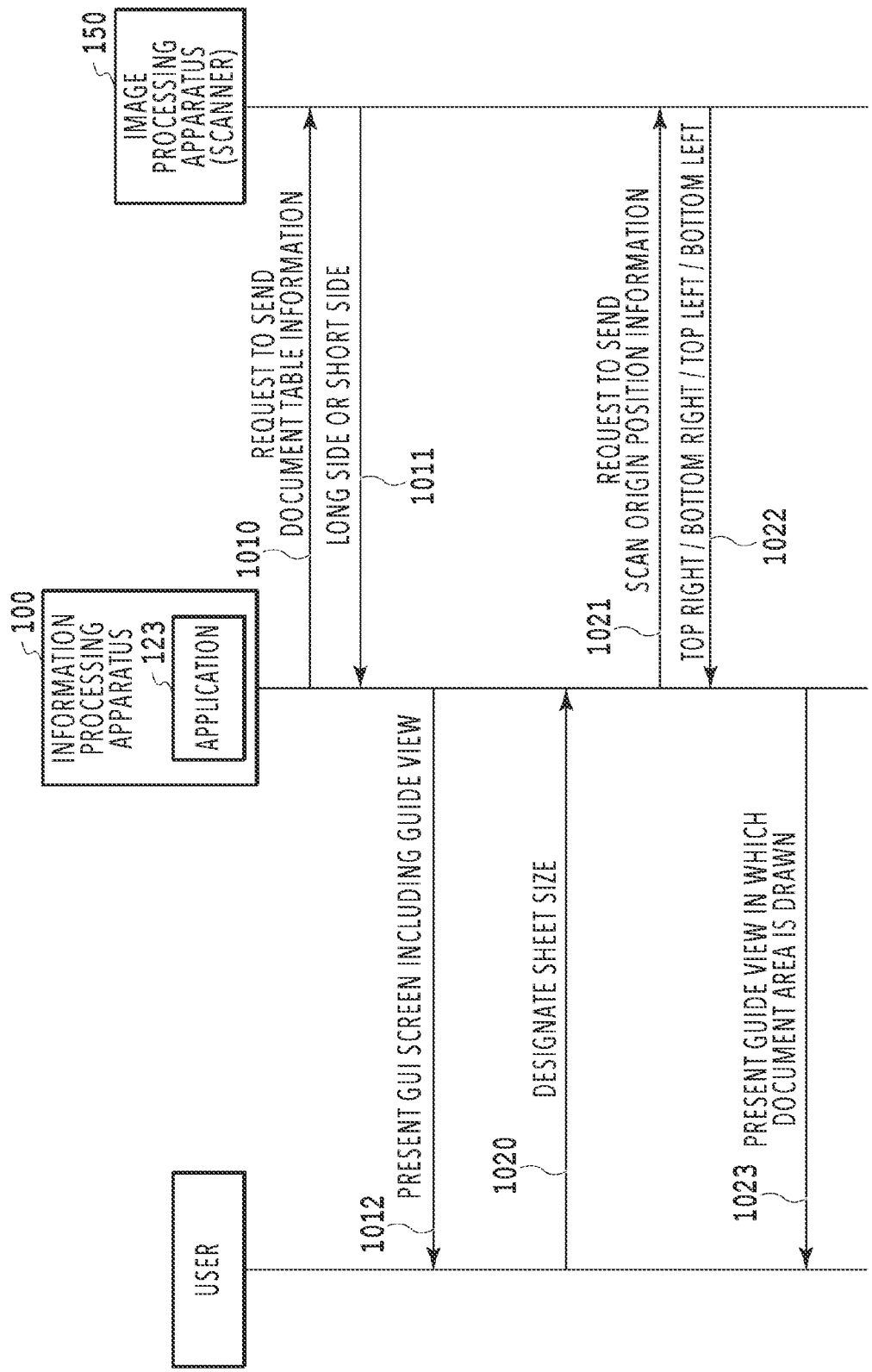
FIG. 23 is a sequence diagram of guide view display processing.

FIG. 23 is a sequence diagram of processing to display a guide view, which is performed by the system in the present embodiment.

A step S1010, the CPU 103 of the information processing apparatus 100 transmits a request to prompt transmission of document table information to the image processing apparatus (that is, scanner) 150 by using the application 123. In the following, "step S-" is abbreviated to "S-".

At S1011, the CPU 155 of the image processing apparatus 150 obtains document table information indicating whether the document table is horizontally oriented or vertically oriented and transmits (returns) the obtained document table information to the information processing apparatus 100 as a reply to the request received at S1010. The document table information that is transmitted by the CPU 155 of the image processing apparatus 150 at this step may be stored in advance in the ROM 154 or the like, or may be generated at the time of reception of the request transmitted at S1010.

At S1012, the CPU 103 of the information processing apparatus 100 creates and displays a GUI screen including the guide view based on the document table information received at S1011 by using the application 123. Due to this, the information processing apparatus 100 presents the GUI screen including the guide view to a user.

At S1020, the CPU 103 of the information processing apparatus 100 obtains instructions to selectively designate the sheet size, which are input by a user via the GUI screen presented at S1012 by using the application 123.

At S1021, the CPU 103 of the information processing apparatus 100 transmits a request prompting transmission of information on the scan origin position to the image processing apparatus 150 by using the application 123.

At S1022, the CPU 155 of the image processing apparatus 150 obtains information (in the following, described as scan origin position information) indicating which of the top right, the bottom right, the bottom left, and the top left the scan origin position is. Then, the CPU 155 transmits (returns) the obtained information to the information processing apparatus 100 as a replay to the request received at S1021. The scan origin position information that is transmitted by the image processing apparatus 150 at this step may be stored in advance in the ROM 154 or the like, or may be generated at the time of reception of the request transmitted at S1010 or S1021.

At S1023, the CPU 103 of the information processing apparatus 100 creates and displays a GUI screen based on the scan origin position information received at S1022 by using the application 123. On this GUI screen, in the guide view, a document area which indicates the sheet size designated at S1020 and which is set from the scan origin is drawn. By this step, how to place the document is presented to a user in an easy-to-see manner.

In FIG. 23, the application of the information processing apparatus (PC) requests the image processing apparatus (scanner) for the information necessary to create the GUI screen. However, the present embodiment is not limited to the aspect such as this. For example, it may also be possible for the PC to store in advance information on each scanner model in the ROM 104 or the like and obtain the information as needed, without communicating with the scanner. Alternatively, it may also be possible to obtain information through the internet or the like.

Figure 24:
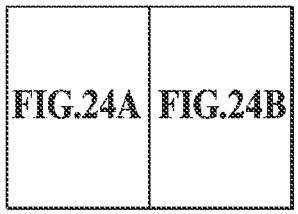
FIG. 24 is a diagram showing the relationship of FIG. 24A and FIG. 24B.
Figure 24A:
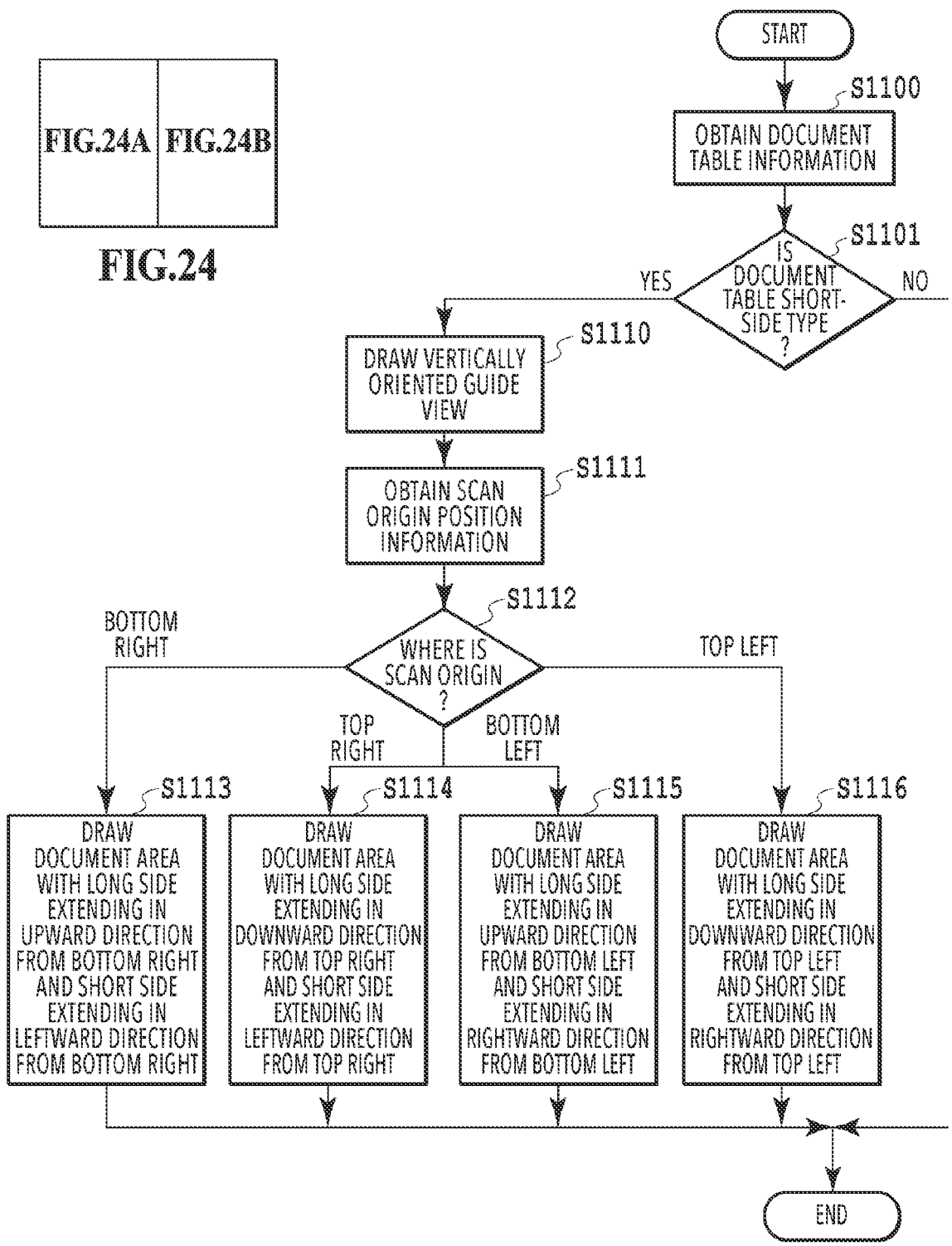
FIG. 24A and FIG. 24B indicate a flowchart of guide view display processing.
Figure 24B:
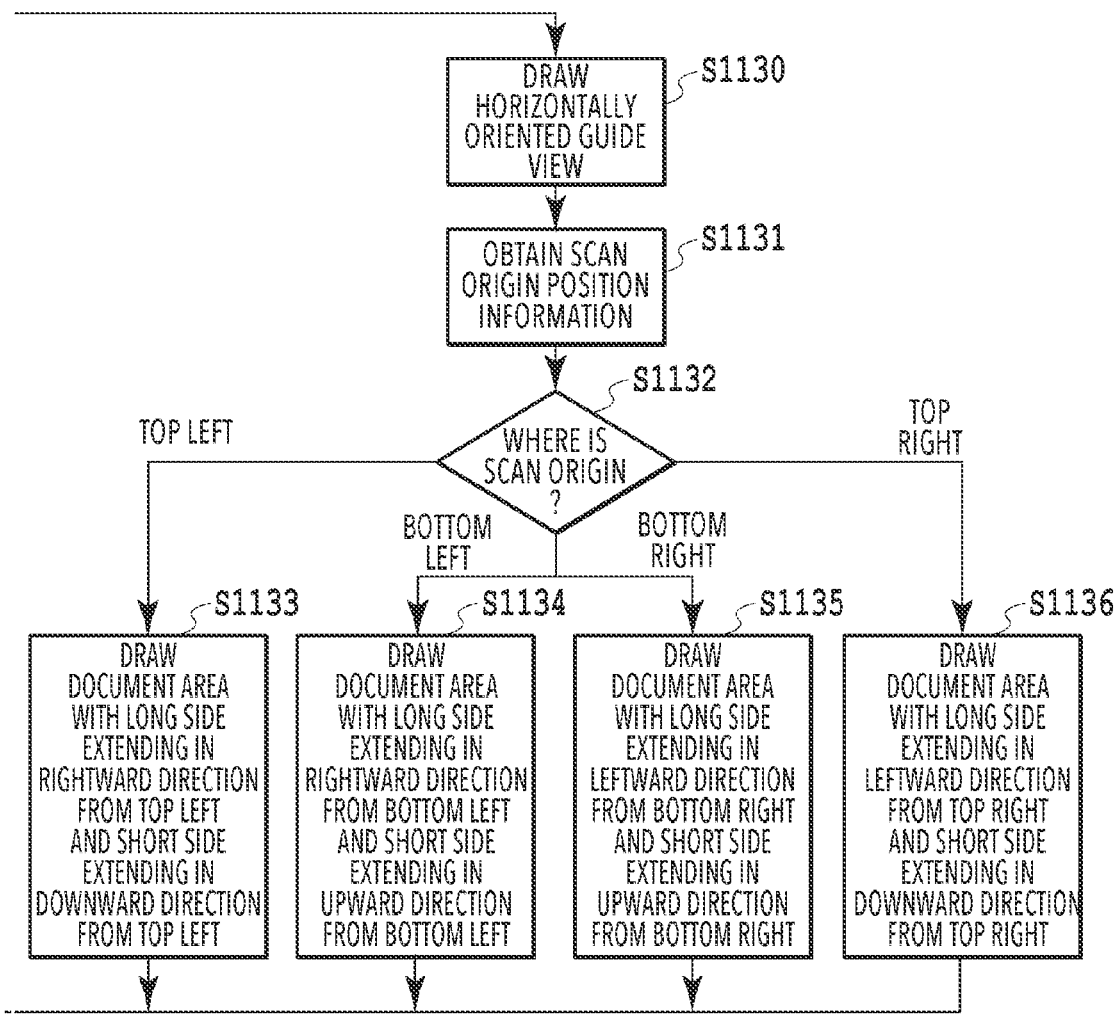

FIG. 24A and FIG. 24B indicate a flowchart of processing that is performed at the time of the CPU 103 of the information processing apparatus 100 creating a GUI screen including a guide view by using the application 123, and displaying the created GUI screen on the display unit 107.

At S1100, the CPU 103 obtains the document table information transmitted by the image processing apparatus 150.

At S1101, the CPU 103 determines whether the document table is the vertically oriented short-side type based on the document table information obtained at S1100. In a case where determination results at this step are affirmative, the processing advances to S1110. On the other hand, in a case where determination results at this step are negative (that is, in a case where the document table is the horizontally oriented long-side type), the processing advances to S1130.

First, a case where the document table is the vertically oriented short-side type is explained.

In this case, at S1110, the CPU 103 draws a vertically oriented guide view on the GUI screen.

At S1111, the CPU 103 obtains the scan origin position information.

At S1112, the CPU 103 determines which of the bottom right, the top right, the bottom left, and the top left the scan origin is. In a case where the scan origin is the bottom right, the processing advances to S1113. In a case where the scan origin is the top right, the processing advances to S1114. In a case where the scan origin is the bottom left, the processing advances to S1115. In a case where the scan origin is the top left, the processing advances to S1116.

At S1113, the CPU 103 sets a rectangular document area whose starting point is the bottom right of the guide view and draws the set document area in the guide view drawn at S1110. In the document area that is set at this step, the length of the long side extending in the upward direction from the bottom right point corresponds to the length in the vertical direction of the designated document size. Further, the length of the short side extending in the leftward direction from the bottom right point corresponds to the length in the horizontal direction of the designated document size.

At S1114, the CPU 103 sets a rectangular document area whose starting point is the top right of the guide view and draws the set document area in the guide view drawn at S1110. In the document area that is set at this step, the length of the long side extending in the downward direction from the top right point corresponds to the length in the vertical direction of the designated document size. Further, the length of the short side extending in the leftward direction from the top right point corresponds to the length in the horizontal direction of the designated document size.

At S1115, the CPU 103 sets a rectangular document area whose starting point is the bottom left of the guide view and draws the set document area in the guide view drawn at S1110. In the document area that is set at this step, the length of the long side extending in the upward direction from the bottom left point corresponds to the length in the vertical direction of the designated document size. Further, the length of the short side extending in the rightward direction from the bottom left point corresponds to the length in the horizontal direction of the designated document size.

At S1116, the CPU 103 sets a rectangular document area whose starting point is the top left of the guide view and draws the set document area in the guide view drawn at S1110. In the document area that is set at this step, the length of the long side extending in the downward direction from the top left point corresponds to the length in the vertical direction of the designated document size. Further, the length of the short side extending in the rightward direction from the top left point corresponds to the length in the horizontal direction of the designated document size.

Following the above, a case where the document table is the horizontally oriented long-side type is explained.

In this case, at S1130, the CPU 103 draws a horizontally oriented guide view on the GUI screen.

At S1131, the CPU 103 obtains the scan origin position information.

At S1132, the CPU 103 determines which of the top left, the bottom left, the bottom right, and the top right the scan origin is based on the scan origin position information obtained at S1131. In a case where the scan origin is the top left, the processing advances to S1133. In a case where the scan origin is the bottom left, the processing advances to S1134. In a case where the scan origin is the bottom right, the processing advances to S1135. In a case where the scan origin is the top right, the processing advances to S1136.

At S1133, the CPU 103 sets a rectangular document area whose starting point is the top left of the guide view and draws the set document area in the guide view drawn at S1130. In the document area that is set at this step, the length of the long side extending in the rightward direction from the top left point corresponds to the length in the horizontal direction of the designated document size. Further, the length of the short side extending in the downward direction from the top left point corresponds to the length in the vertical direction of the designated document size.

At S1134, the CPU 103 sets a rectangular document area whose starting point is the bottom left of the guide view and draws the set document area in the guide view drawn at S1130. In the document area that is set at this step, the length of the long side extending in the rightward direction from the bottom left point corresponds to the length in the horizontal direction of the designated document size. Further, the length of the short side extending in the upward direction from the bottom left point corresponds to the length in the vertical direction of the designated document size.

At S1135, the CPU 103 sets a rectangular document area whose starting point is the bottom right of the guide view and draws the set document area in the guide view drawn at S1130. In the document area that is set at this step, the length of the long side extending in the leftward direction from the bottom right point corresponds to the length in the horizontal direction of the designated document size. Further, the length of the short side extending in the upward direction from the bottom right point corresponds to the length in the vertical direction of the designated document size.

At S1136, the CPU 103 sets a rectangular document area whose starting point is the top right of the guide view and draws the set document area in the guide view drawn at S1130. In the document area that is set at this step, the length of the long side extending in the leftward direction from the top right point corresponds to the length in the horizontal direction of the designated document size. Further, the length of the short side extending in the downward direction from the top right point corresponds to the length in the vertical direction of the designated document size.

<Effects of the Present Embodiment>

According to the present embodiment, it is made possible to implement a unit configured to present the position at which a document is placed to a user in an easy-to-see manner on a GUI screen on which the user gives scan instructions.

Second Embodiment

According to the first embodiment, it is made possible to implement a unit configured to present the position at which a document is placed to a user in an easy-to-see manner on a GUI screen on which the user gives scan instructions. However, depending on how the document is placed at the position, there is a case where results desired by a user are not obtained. For example, an image inverted upside down is obtained, a vertically oriented scanned image is obtained in a case where a horizontally oriented document is scanned, and so on.

In a case where printing based on an obtained scanned image is aimed at, irrespective of the orientation of the document, it is sufficient to rotate the output printed material itself. Because of this, in the copy machine and the like, as described in the first embodiment, it is sufficient to take into consideration the document size and the position at which the document is placed. However, in a case where a display is produced on the display based on the obtained scanned image, the correct orientation is required at the time of placing the image. Consequently, in the present embodiment, a guide view is implemented on a GUI screen, which is capable of presenting the correct position and the correct orientation at the time of placing a document to a user in an easy-to-see manner.

Figure 25:
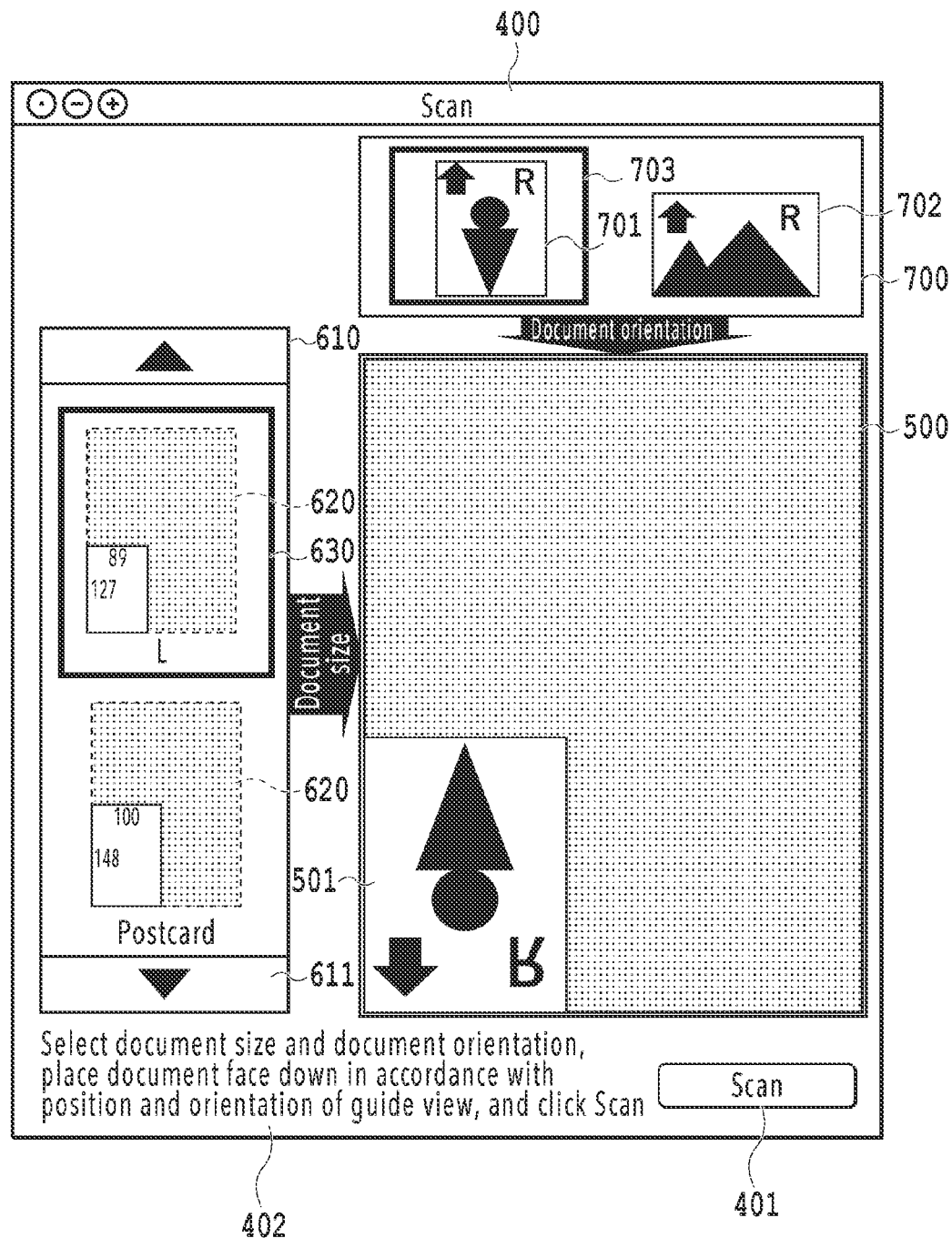
FIG. 25 is a scan setting GUI screen of an SFS on which it is possible to designate a document orientation.

FIG. 25 is a diagram showing the scan window 400 in which it is possible to designate the document orientation in the present embodiment. Compared to the scan window (FIG. 11 and the like) explained in the first embodiment, a document orientation designation unit 700 is added and in the document area 501 in the guide view 500, an image indicating an orientation is drawn additionally. A user designates whether the scan-target document is portrait (vertically oriented) or landscape (horizontally oriented) by selecting one of an image 701 and an image 702, which are displayed in the document orientation designation unit 700.

By causing a user to select portrait or landscape via the scan window 400 of the present embodiment, it is possible to prevent 90-degree rotation or 270-degree rotation of the scanned image. However, it is not possible to prevent the scanned image from being inverted upside down. Consequently, to the image for selecting portrait or landscape, information indicating which direction is the upward direction of the document is added. Specifically, in the image 701, an image by which the upward direction of a document is known is arranged, such as an image of a mark of a person (the direction in which the head is above is the upward direction), an image of an arrow (the direction in which the tip of the arrow points is the upward direction), and an image of a character (the direction in which the character can be read normally is the upward direction). Further, in the image 702, the image is changed from the image of a person to the image by which a landscape is imagined. In addition to the images described here, it may also be possible to appropriately adopt an image by which a user can grasp the upward direction intuitively by switching the image to a document image in a case where an A4-size document that is considered to be a text document is selected and the like.

In the guide view 500, an image indicating the orientation in which a document should be placed is displayed within the document area 501 displayed in accordance with the document size. As explained in the first embodiment, in a case where a document is placed, it is necessary to place the document face down so that the surface to be scanned is located on the side of the document table. Consequently, as the image that is displayed in the guide view 500, the image obtained by mirror-image inverting the image that is displayed in the document orientation designation unit 700 is set. Then, for example, in a case where the scan origin is located at the bottom left, the lower side of the document table corresponds to the obverse side of the document, and therefore, the mirror-image inverted image is rotated 180 degrees and displayed within the document area 501.

Figure 26:
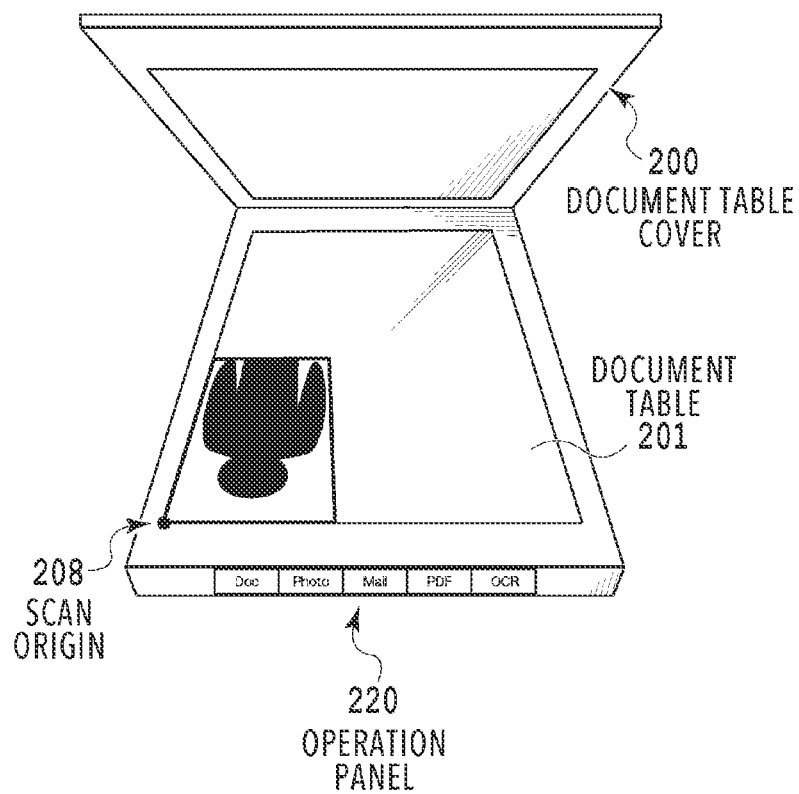
FIG. 26 is a bird's eye diagram of a scanner (SFS) on which an L-size vertically oriented document is placed.

FIG. 26 shows the state where a user to whom the guide view 500 shown in FIG. 25 has been presented places the L-size vertically oriented photo document on the document table 201. To be strict, the surface to be scanned is the reverse side, and therefore, it is not possible to see the image from above, but here, for convenience, it is assumed that the image on the reverse side is seen through from above. It is possible for a user to obtain the scanned image whose orientation is correct by pressing down the Scan button 401 in this state.

Figure 27:
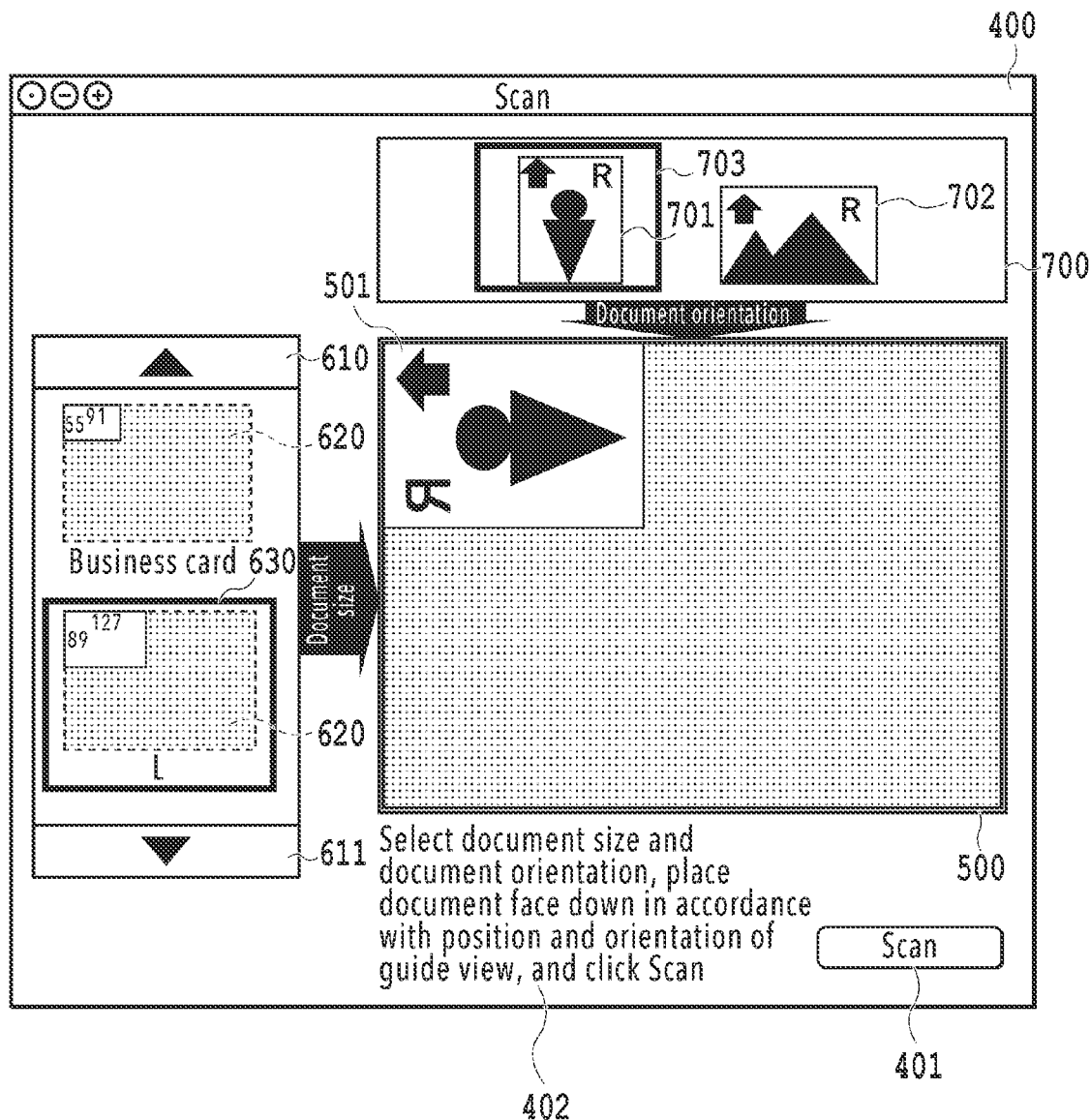
FIG. 27 is a scan setting GUI screen of an MFP on which it is possible to designate a document orientation.

FIG. 27 shows an example of a GUI screen in the present embodiment. This GUI screen is the scan setting GUI screen that is displayed in a case where the L-size vertically oriented photo document in FIG. 9 is scanned by using the MFP in FIG. 17. The setting contents themselves are that the document size is "L" and the document orientation is "vertically oriented". As shown in FIG. 17, the document table of the MFP is horizontally oriented, and therefore, in the scan window 400, the guide view 500 corresponding to the document table is also displayed as a horizontally oriented view. Further, the scan origin is the top left, and therefore, the document area 501 is set from the top left of the guide view 500. Furthermore, in a case where the document is vertically oriented, the upward direction in the document corresponds to the leftward direction on the document table, and therefore, the way of placement is presented in which the left side of the guide view 500 aligns with the upper side of the document area 501.

Figure 28:
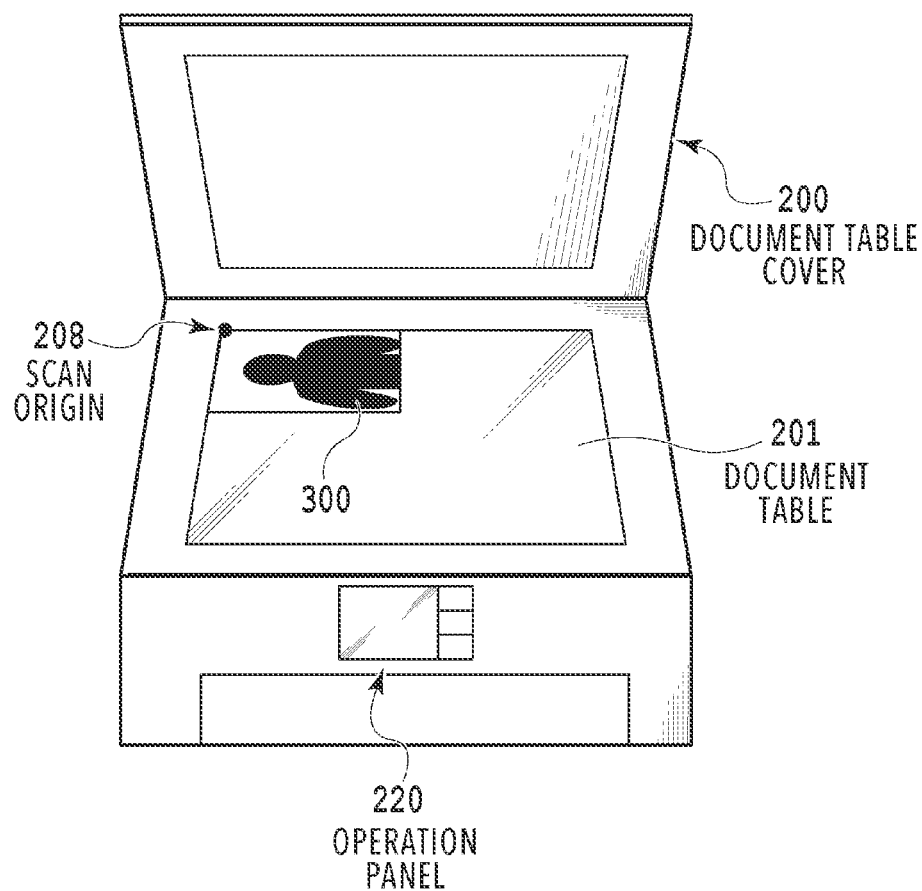
FIG. 28 is a bird's eye diagram of a scanner (MFP) on which an L-size vertically oriented document is placed.

FIG. 28 shows the state where a user actually places the document 300 on the document table 201 with reference to the document area 501 in the guide view 500 shown in FIG. 27. It is possible for a user to obtain the desired scanned image by pressing down the Scan button 401 in FIG. 27 in this state.

Figure 29:
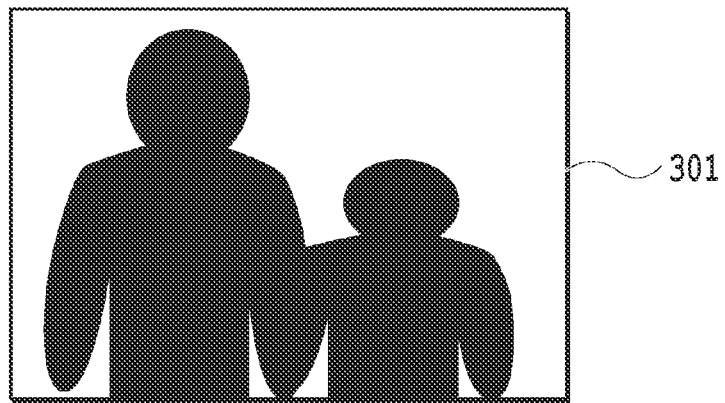
FIG. 29 is an L-size horizontally oriented document.

FIG. 29 shows an L-size horizontally oriented (landscape) photo document 301 as an example of a scan target. It is assumed that the contents of the photo document are two persons captured side by side as shown schematically. In the following, a method of scanning this photo document is explained.

Figure 30:
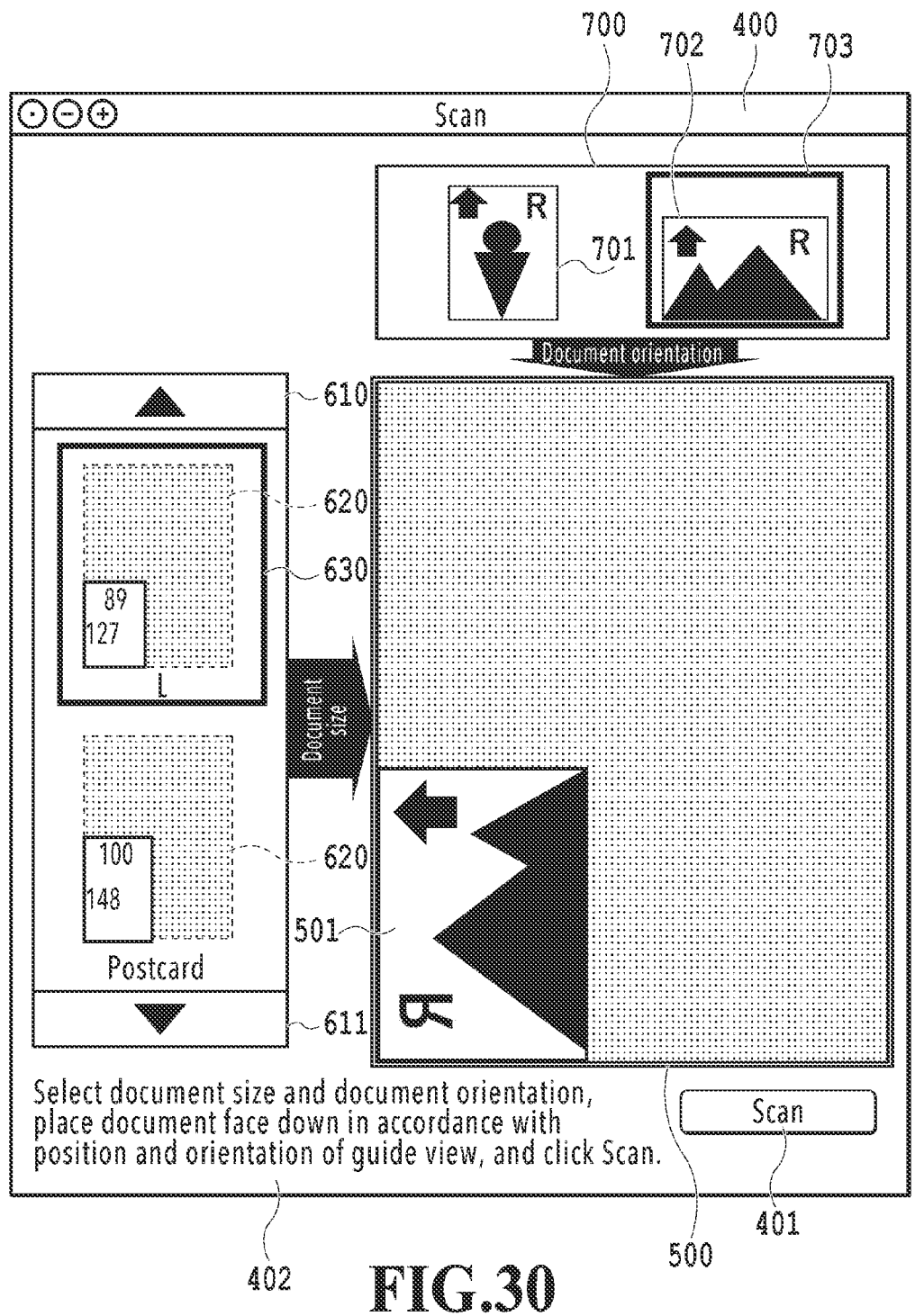
FIG. 30 is a scan setting GUI screen of an SFS on which it is possible to designate a document orientation.

FIG. 30 shows the state where an L-size horizontally oriented document is selected via the scan window 400, which is the GUI screen of the SFS shown in FIG. 8. Here, in a case where a horizontally oriented document is designated, the left side of the document table and the upper side of the document are caused to align with each other. Consequently, the image that is displayed in the document area 501 in the guide view 500 is the image obtained by mirror-image inverting and then rotating 270 degrees the horizontally oriented document image 702.

Figure 31:
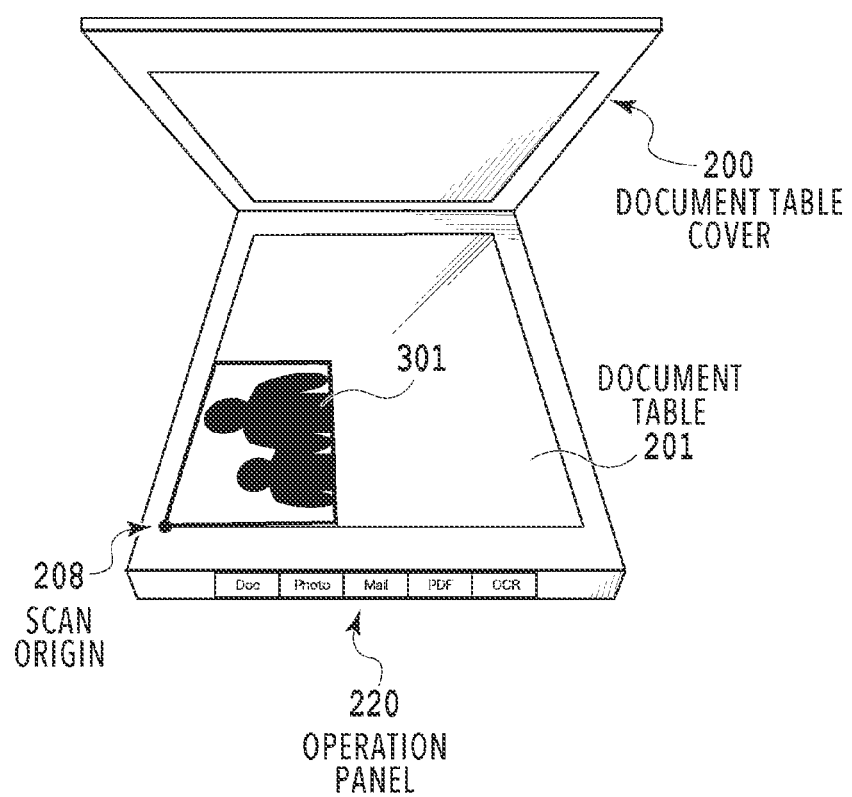
FIG. 31 is a bird's eye diagram of a scanner (SFS) on which an L-size horizontally oriented document is placed.

FIG. 31 shows the state where a user actually places the document 301 (see FIG. 29) on the document table 201 with reference to the document area 501 in the guide view 500 shown in FIG. 30. It is possible for a user to obtain the scanned image with the desired orientation by pressing down the Scan button 401 in FIG. 30 in this state.

Figure 32:
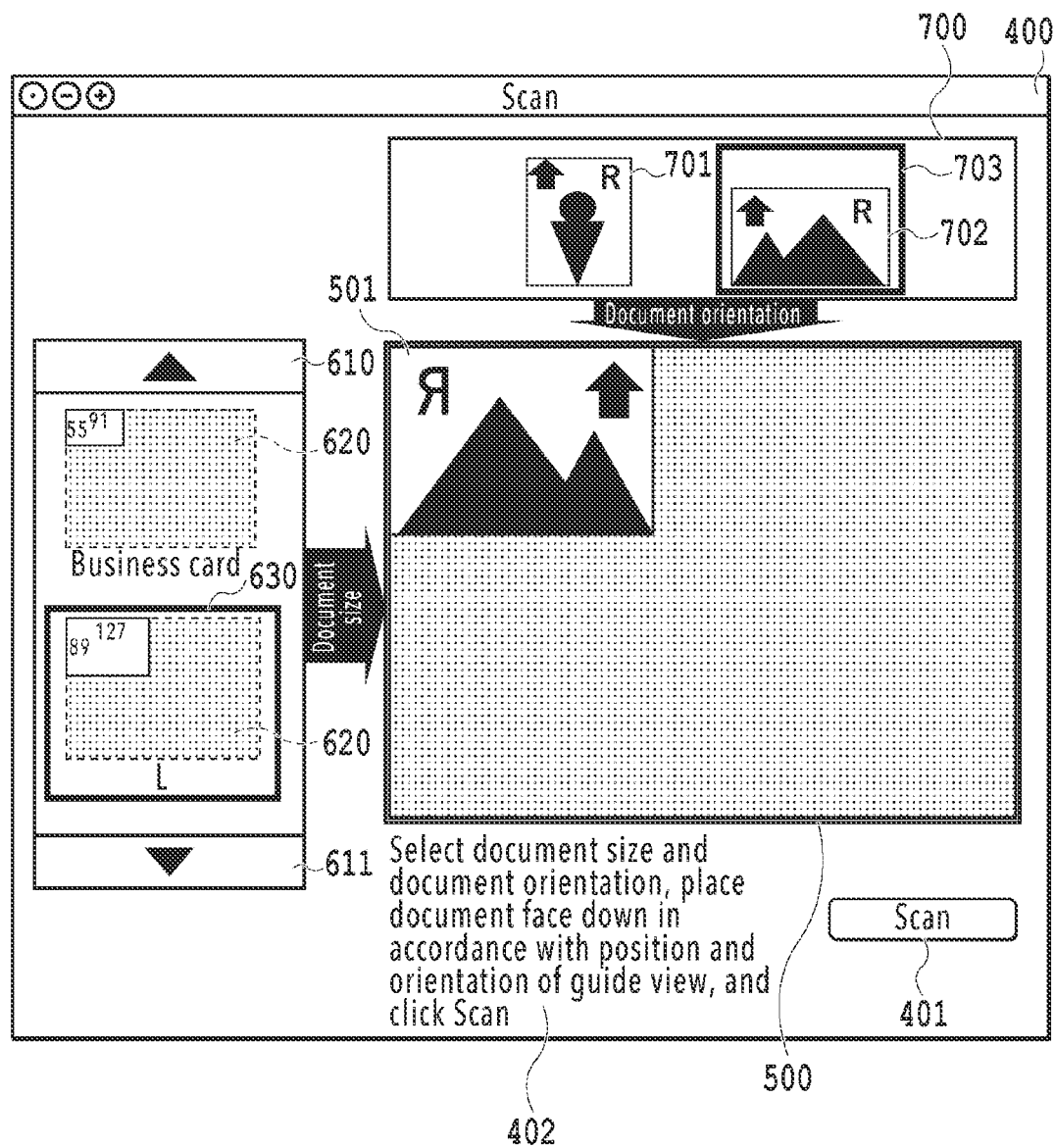
FIG. 32 is a scan setting GUI screen of an MFP on which it is possible to designate a document orientation.

FIG. 32 shows the state where the L-size horizontally oriented document is selected via the scan window 400, which is the GUI screen of the MFP shown in FIG. 17. In the present embodiment, the scan origin is the top left, and therefore, the upper side of the horizontally oriented document area 501 and the upper side of the guide view 500 are caused to align with each other. The image that is displayed in the document area 501 is the image obtained by mirror-image inverting the horizontally oriented document image 702.

Figure 33:
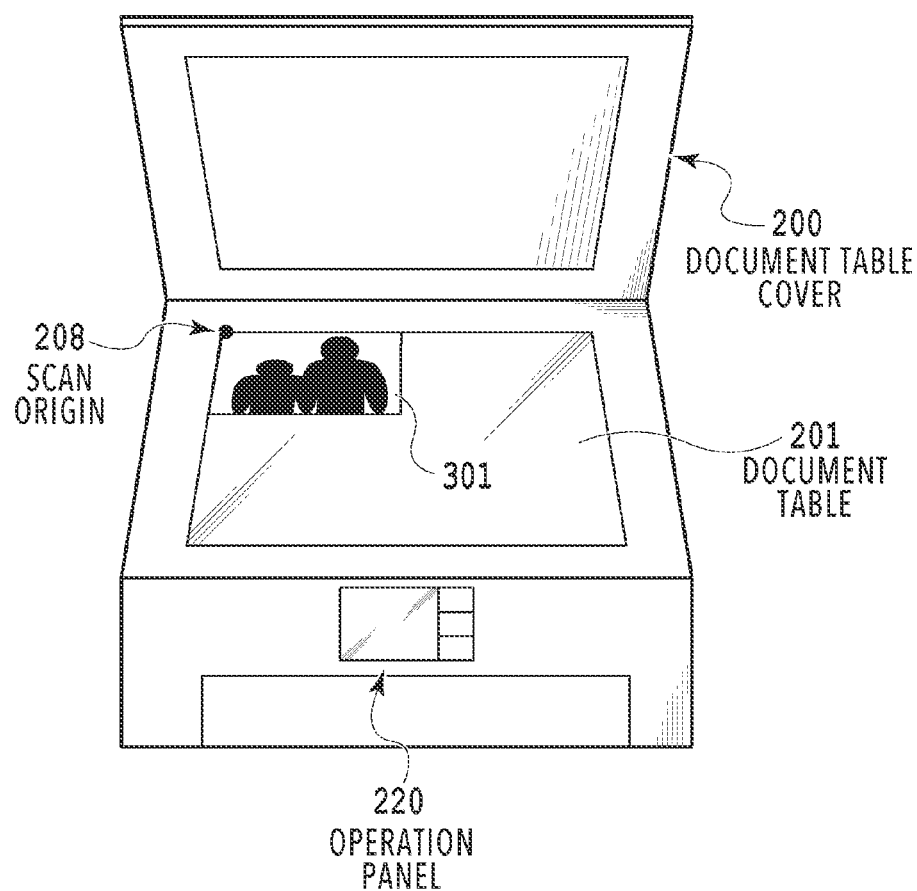
FIG. 33 is a bird's eye diagram of a scanner (MFP) on which an L-size horizontally oriented document is placed.

FIG. 33 shows the state where a user actually places the document 301 (see FIG. 29) on the document table 201 with reference to the document area 501 in the guide view 500 shown in FIG. 32. It is possible for a user to obtain the scanned image with the desired orientation by pressing down the Scan button 401 in FIG. 32 in this state.

Figure 34:
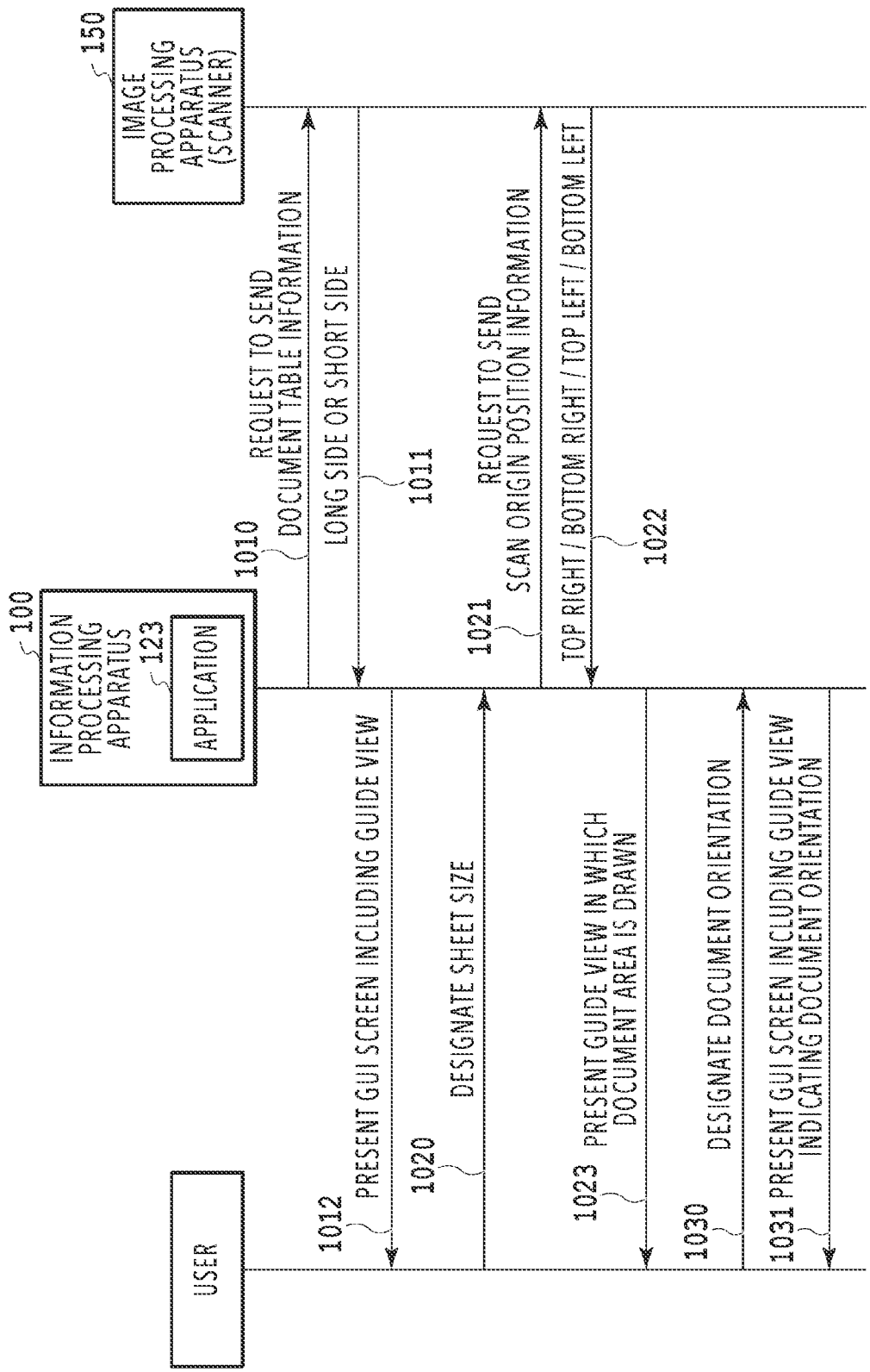
FIG. 34 is a sequence diagram of guide view display processing.

FIG. 34 is a sequence diagram of the guide view display processing in the present embodiment. Compared to the first embodiment (FIG. 23), S1010 to S1023 are the same but the difference from the sequence diagram of the first embodiment is that the sequence diagram of the present embodiment further has S1030 and S1031.

At S1030, the CPU 103 of the information processing apparatus 100 obtains instructions to designate the document orientation, which are input by a user via the GUI screen presented at S1023.

At S1031, the CPU 103 of the information processing apparatus 100 displays a GUI screen on which the orientation in a case where the document is placed is displayed as a result of the updating based on the contents of the instructions received at S1030.

Figure 35B:
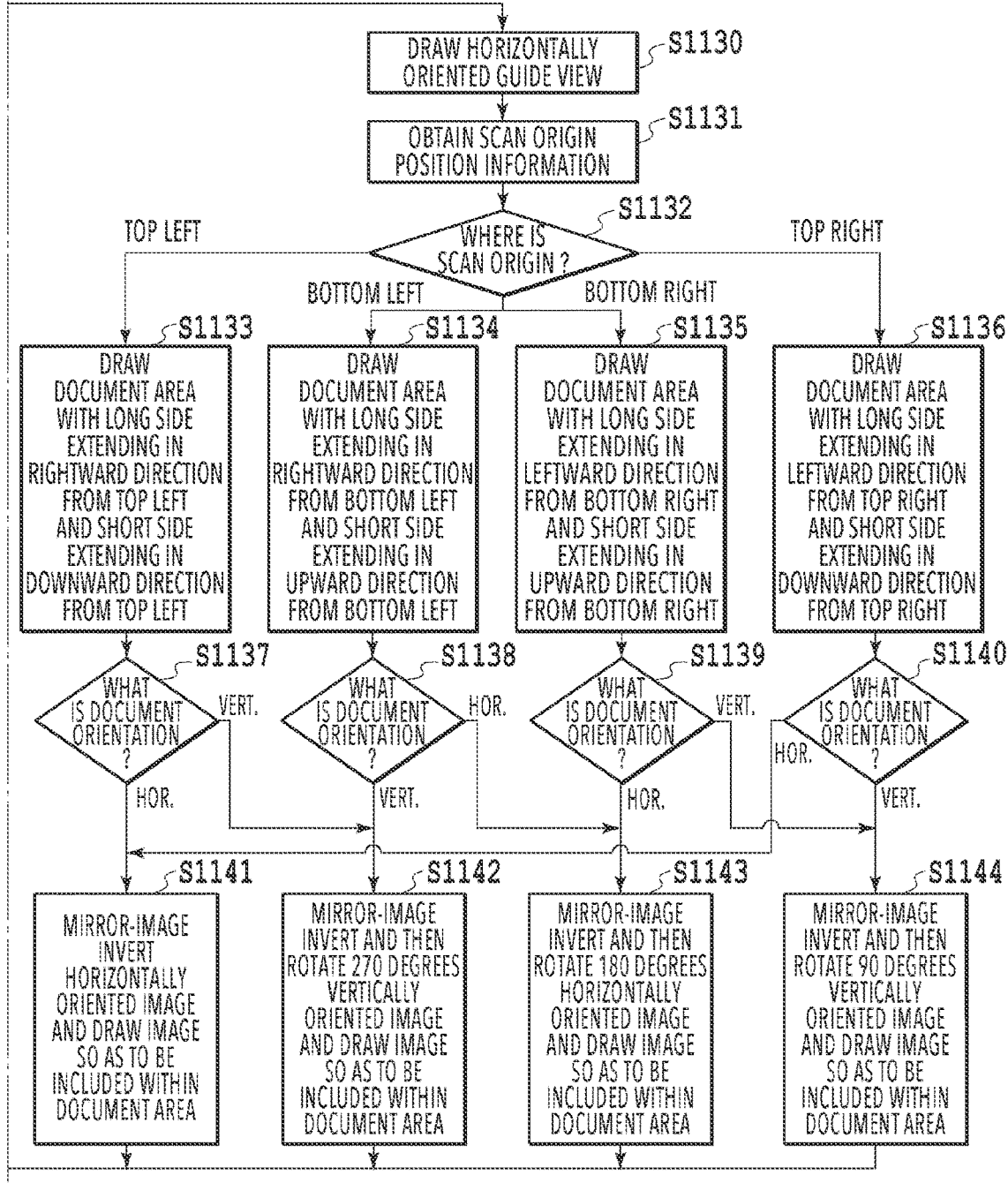

FIG. 35A and FIG. 35B indicate a flowchart of the guide view display processing in the present embodiment. As in the first embodiment, the guide view display processing is processing that is performed by the CPU 103 of the information processing apparatus 100 using the application 123 and the flowchart has S1100 to S1116 and S1130 to S1136 (see FIG. 24A and FIG. 24B). However, the flowchart of the present embodiment differs from that of the first embodiment in further having S1117 to S1124 and S1137 to S1144. In the following, the contents of the embodiment described previously are omitted appropriately and different contents are explained mainly.

After S1113, the CPU 103 determines whether the document orientation is vertically oriented or horizontally oriented at S1117. In a case where the document orientation is vertically oriented, the processing advances to S1124. On the other hand, in a case where the document orientation is horizontally oriented, the processing advances to S1121.

After S1114, the CPU 103 determines whether the document orientation is vertically oriented or horizontally oriented at S1118. In a case where the document orientation is vertically oriented, the processing advances to S1122. On the other hand, in a case where the document orientation is horizontally oriented, the processing advances to S1121.

After S1115, the CPU 103 determines whether the document orientation is vertically oriented or horizontally oriented at S1119. In a case where the document orientation is vertically oriented, the processing advances to S1124. On the other hand, in a case where the document orientation is horizontally oriented, the processing advances to S1123.

After S1116, the CPU 103 determines whether the document orientation is vertically oriented or horizontally oriented at S1120. In a case where the document orientation is vertically oriented, the processing advances to S1122. On the other hand, in a case where the document orientation is horizontally oriented, the processing advances to S1123.

At S1121, the CPU 103 mirror-image inverts and then rotates 270 degrees the horizontally oriented image, resizes the image so that the image is included in the document area 501 drawn at S1113 or S1114, and draws the image in the guide view 500.

At S1122, the CPU 103 mirror-image inverts the vertically oriented image, resizes the image so that the image is included in the document area 501 drawn at S1114 or S1116, and draws the image in the guide view 500.

At S1123, the CPU 103 mirror-image inverts and then rotates 90 degrees the horizontally oriented image, resizes the image so that the image is included in the document area 501 drawn at S1115 or S1116, and draws the image in the guide view 500.

At S1124, the CPU 103 mirror-image inverts and then rotates 180 degrees the vertically oriented image, resizes the image so that the image is included in the document area 501 drawn at S1113 or S1115, and draws the image in the guide view 500.

After S1133, the CPU 103 determines whether the document orientation is vertically oriented or horizontally oriented at S1137. In a case where the document orientation is vertically oriented, the processing advances to S1142. On the other hand, in a case where the document orientation is horizontally oriented, the processing advances to S1141.

After S1134, the CPU 103 determines whether the document orientation is vertically oriented or horizontally oriented at S1138. In a case where the document orientation is vertically oriented, the processing advances to S1142. On the other hand, in a case where the document orientation is horizontally oriented, the processing advances to S1143.

After S1135, the CPU 103 determines whether the document orientation is vertically oriented or horizontally oriented at S1139. In a case where the document orientation is vertically oriented, the processing advances to S1144. On the other hand, in a case where the document orientation is horizontally oriented, the processing advances to S1143.

After S1136, the CPU 103 determines whether the document orientation is vertically oriented or horizontally oriented at S1140. In a case where the document orientation is vertically oriented, the processing advances to S1144. On the other hand, in a case where the document orientation is horizontally oriented, the processing advances to S1141.

At S1141, the CPU 103 mirror-image inverts the horizontally oriented image, resizes the image so that the image is included in the document area 501 drawn at S1133 or S1136, and draws the image in the guide view 500.

At S1142, the CPU 103 mirror-image inverts and then rotates 270 degrees the vertically oriented image, resizes the image so that the image is included in the document area 501 drawn at S1133 or S1134, and draws the image in the guide view 500.

At S1143, the CPU 103 mirror-image inverts and then rotates 180 degrees the horizontally oriented image, resizes the image so that the image is included in the document area 501 drawn at S1134 or S1135, and draws the image in the guide view 500.

At S1144, the CPU 103 mirror-image inverts and then rotates 90 degrees the vertically oriented image, resizes the image so that the image is included in the document area 501 drawn at S1135 or S1136, and draws the image in the guide view 500.

Figure 36:
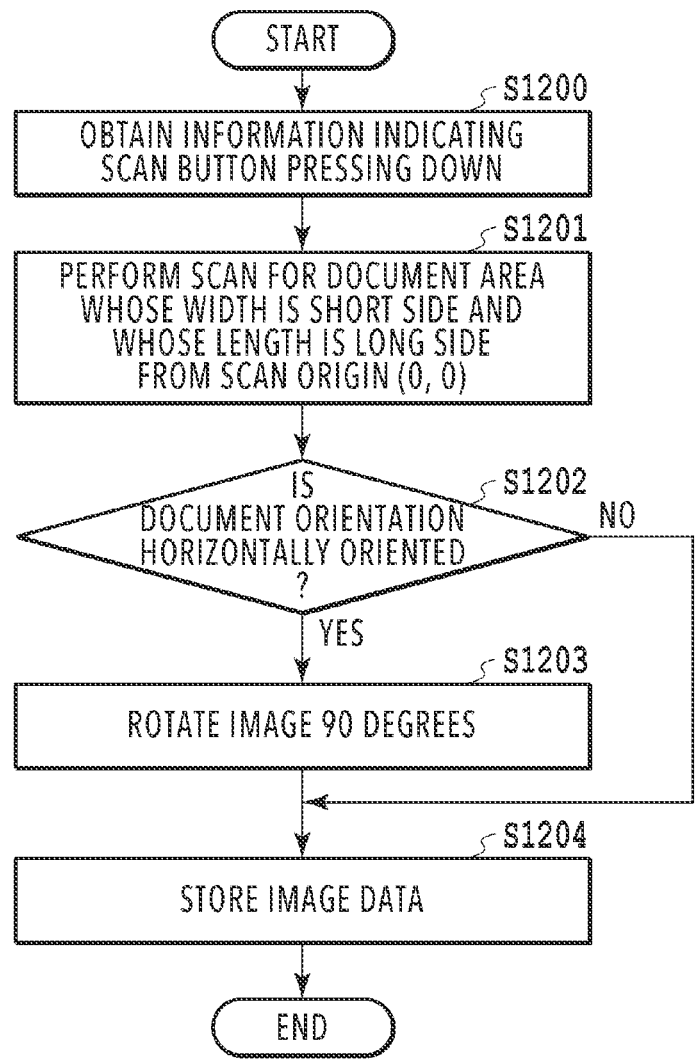
FIG. 36 is a flowchart of scan processing.

FIG. 36 is a flowchart of processing that is performed in accordance with the application 123 in a case where a user presses down the Scan button 401.

At S1200, the CPU 103 of the information processing apparatus 100 obtains information indicating that the Scan button 401 has been pressed down by a user and in response to the obtaining, instructs the image processing apparatus 150 to perform scan processing.

At S1201, the CPU 155 of the image processing apparatus 150 performs, by using the scanner engine 153, the scan processing for the document area (whose width in the horizontal direction corresponds to the short side and whose height in the vertical direction corresponds to the long side), which is set by taking the scan origin as a reference. The image data obtained at this step is transmitted to the information processing apparatus 100.

At S1202, the CPU 103 of the information processing apparatus 100 determines whether the document orientation is horizontally oriented by using the setting information on the document orientation. In a case where determination results at this step are affirmative, the processing advances to S1203 and on the other hand, in a case where the determination results are negative, the processing advances to S1204.

At S1203, the CPU 103 of the information processing apparatus 100 rotates 90 degrees the image, which is the scan results. In a case where the document orientation is vertically oriented (NO at S1202), the rotation at this step is not performed.

Lastly, at S1204, the CPU 103 of the information processing apparatus 100 stores the image data of the scan results in the ROM 104, the RAM 105, the external storage device 106 or the like.

<Effects of the Present Embodiment>

According to the present embodiment, it is made possible to implement a guide view, by which it is possible to obtain a scanned image whose orientation is correct, on a GUI screen.

Third Embodiment

In the embodiments described previously, as shown in FIG. 8 and the like, it is premised that the apparatus is installed in the standard way of placement, such as that the document table cover is attached to the opposite side of the operation panel so that the operation panel is located on the front side of a user and the document table cover is located on the back side. However, a case where a user desires to install the scanner not in the standard way of placement because of the convenience of the user, or a case where the document table cover is not installed on the opposite side of the operation panel because of the convenience of a designer is considered. Consequently, in the present embodiment, a guide view capable of dealing with the case such as this is implemented on a GUI screen.

Figure 37:
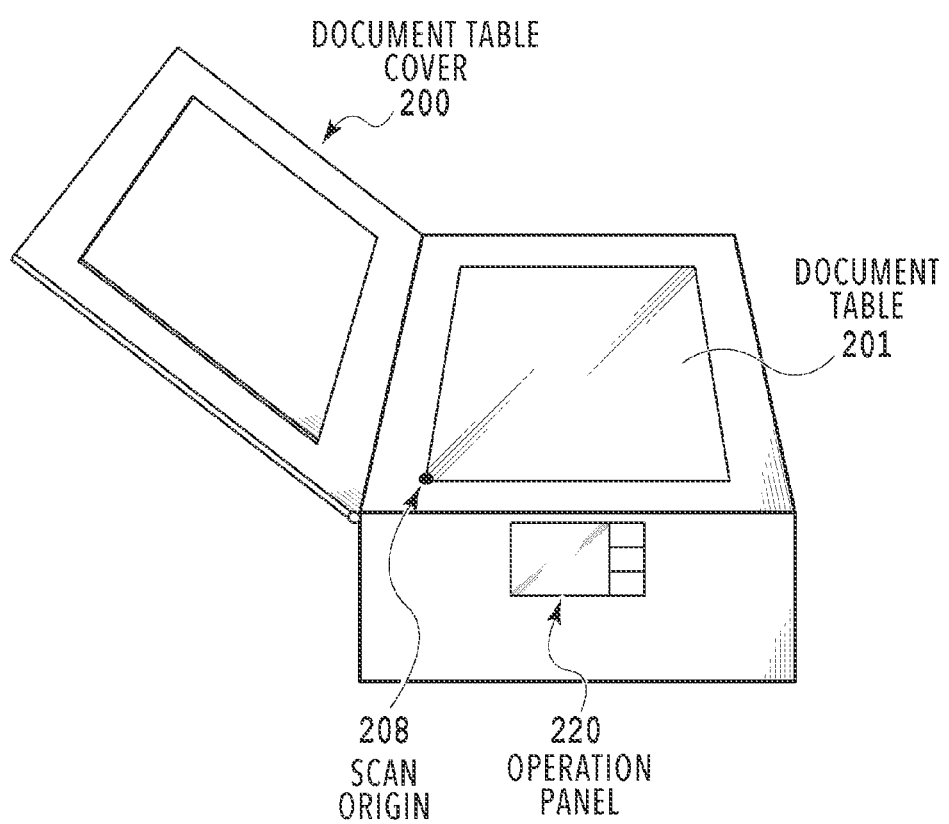
FIG. 37 is a bird's eye diagram of a scanner (MFP) in which a document table cover is installed so as to be located on the left side of an operation panel.

FIG. 37 shows a case where the document table cover 200 is located on the "left" side of the operation panel 220 and the document table cover is vertically oriented, and therefore, document table information is defined as vertically oriented and the scan origin is the bottom left in the guide view. In the case such as this, the state of the installed scanner and the display contents of the guide view do not match with each other, and therefore, it is difficult for a user to understand.

Figure 38:
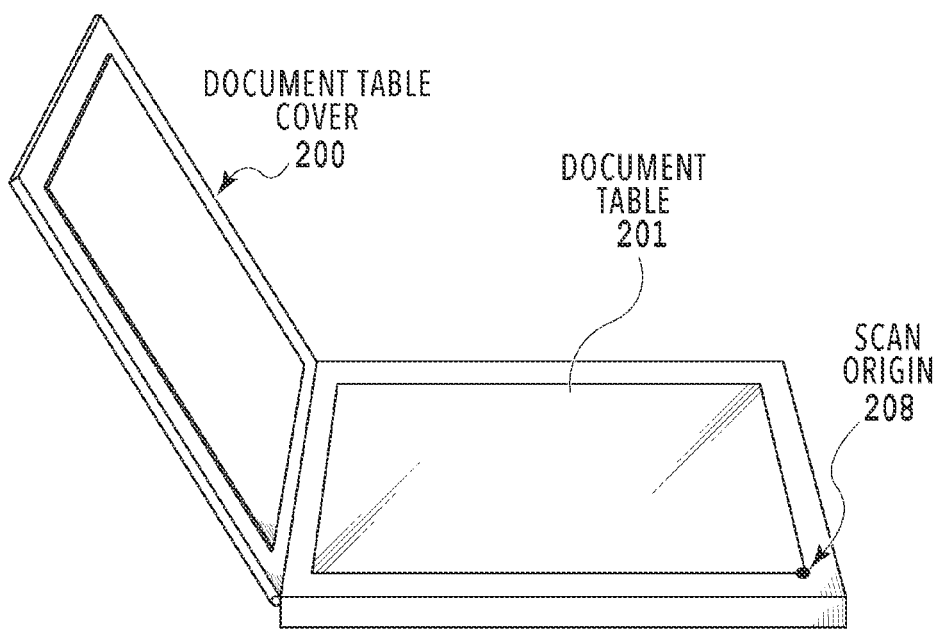
FIG. 38 is a bird's eye diagram of a scanner (SFS) in which a document table cover is installed so as to be located on the left side.

FIG. 38 shows the state where the vertically oriented SFS (see FIG. 7B) whose standard way of placement is that the operation panel is located on the "front" side and the document table cover is located on the "back" side is installed by a user so that the document table cover is located on the "left" side. In a case where the installation is performed as described above, the state of the installed scanner and the display contents of the guide view do not match with each other, and therefore, this will become difficult for a user to understand.

Figure 39:
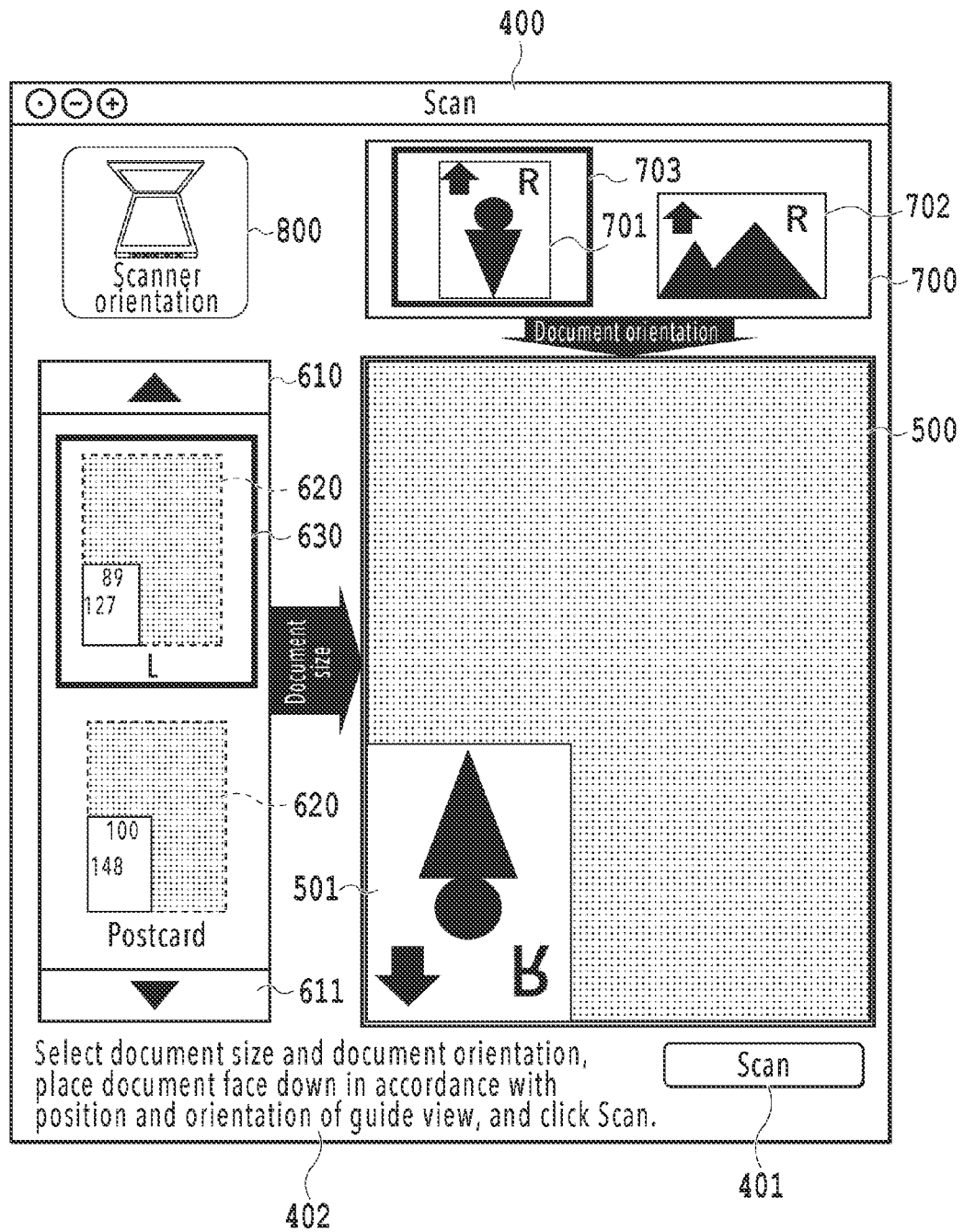
FIG. 39 is a scan setting GUI screen of an SFS on which it is possible to designate a scanner orientation.

FIG. 39 shows a GUI screen in a case where the SFS is installed in the standard way of placement. At this time, as shown in FIG. 39, the guide view 500 is displayed as a vertically oriented view, but on the other hand, in a case where the SFS is installed so that the document table cover is located on the "left" side and the document table is horizontally oriented as shown in FIG. 38, a problem will arise. In the case such as this, the display contents of the guide view and the state of the installed SFS do not match with each other.

Figure 40:
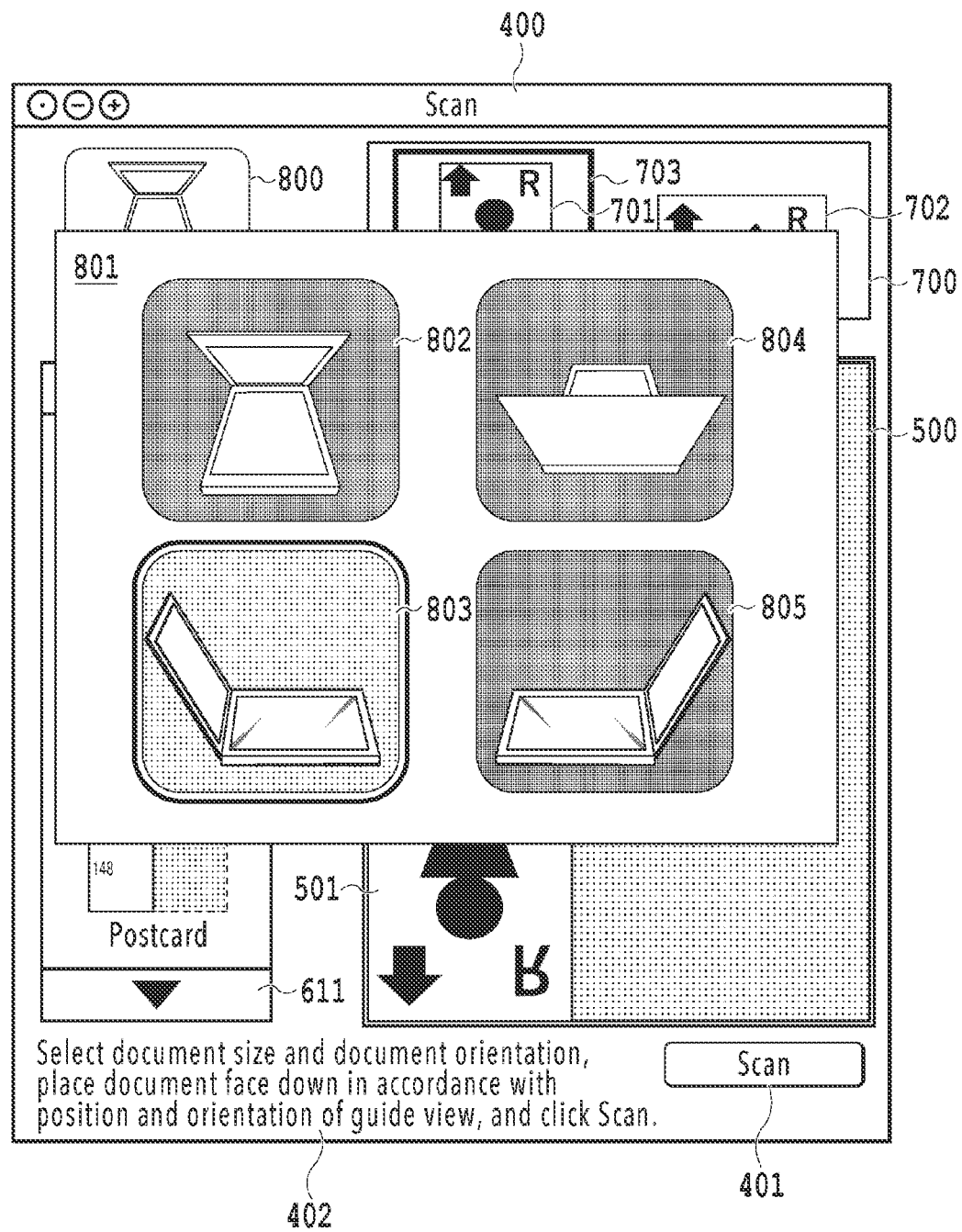
FIG. 40 are icons that are selected at the time of designating a scanner orientation.

In order to deal with the problem such as this, on the GUI screen of the present embodiment, as shown in FIG. 39, a scanner orientation designation button 800 is provided. In a case where a user presses down the scanner orientation designation button 800, as shown in FIG. 40, a popup window 801 is displayed. In the popup window 801, there are four icons indicating how the scanner is arranged in a case where the scanner is viewed from a user by using a positional relationship between the document table cover and the document table. In the standard state, the top-left icon in which the document table cover is located on the "back" side is selected, but it is possible for a user to select an icon suited to the actual way of placement, for example, to select the bottom left icon in which the document table cover is located on the "left" side in accordance with the way of placement shown in FIG. 38.

Figure 41:
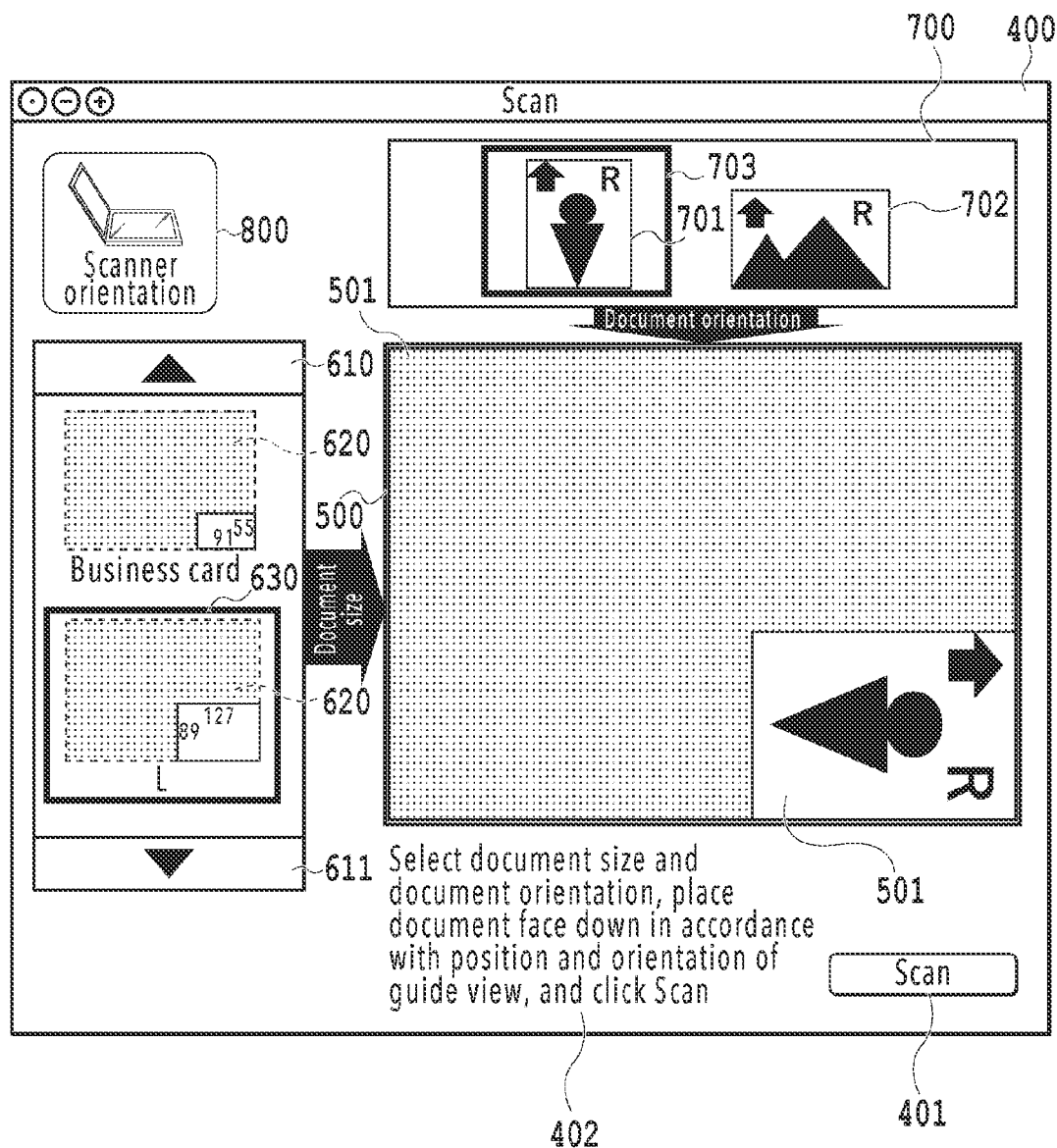
FIG. 41 is a GUI screen in a case where the scanner orientation has been changed.

FIG. 41 shows the scan window 400 in a case where an icon 803 in FIG. 40 is selected after the scanner is installed so that the document table cover is located on the "left" side. In the scan window 400, the guide view 500 is displayed by being rotated 270 degrees, and as a result, the display is such that the document table is horizontally oriented and the scan origin is the bottom right. As described above, the state of the installed scanner and the display contents of the guide view match with each other, and therefore, this is easy for a user to understand.

Figure 42:
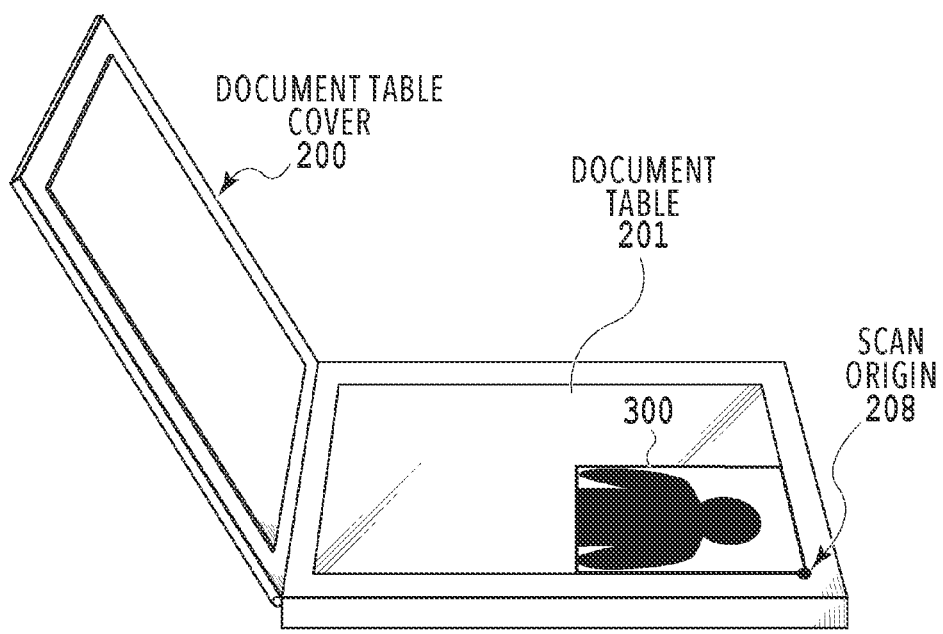
FIG. 42 is a bird's eye diagram of a scanner (SFS) on which a document is placed by a user who views the GUI screen in a case where the scanner orientation has been changed.

FIG. 42 shows the state where a user actually places the document 300 on the document table 201 with reference to the document area 501 in the guide view 500 shown in FIG. 41. It is possible for a user to obtain the desired scanned image by pressing down the Scan button in FIG. 41 in this state.

Figure 43:
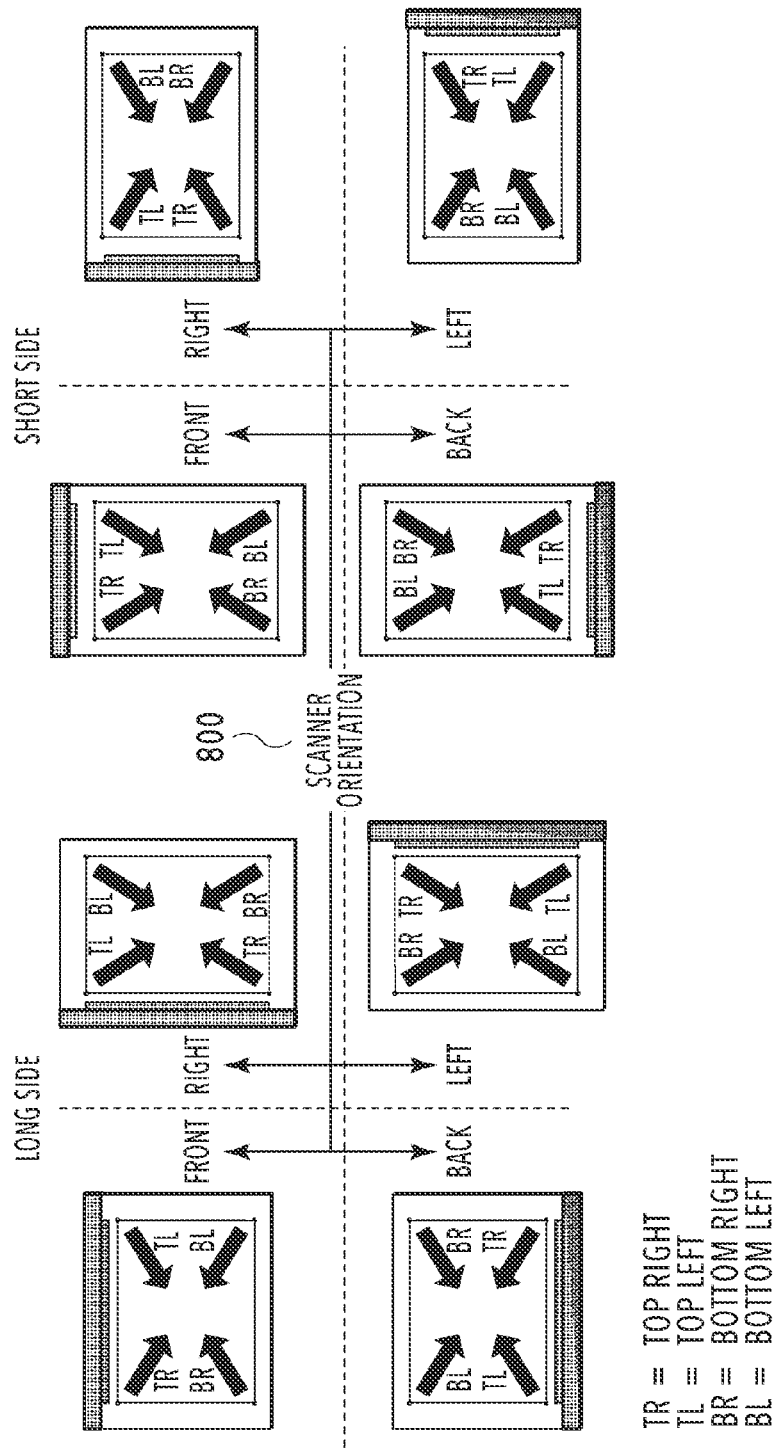
FIG. 43 is patterns of changes in scanner orientation.

FIG. 43 shows how the display of the guide view changes in accordance with the designation of scanner orientation via the GUI screen (see FIG. 39, FIG. 40 and the like) of the present embodiment. In the present embodiment, the "scanner orientation" means the direction in which the document table extends with the attachment portion of the document table and the document table color being taken as a reference. For example, a case where the scanner direction is "front" means that the document table extends from the "back" side toward the "front" side.

Figure 44:
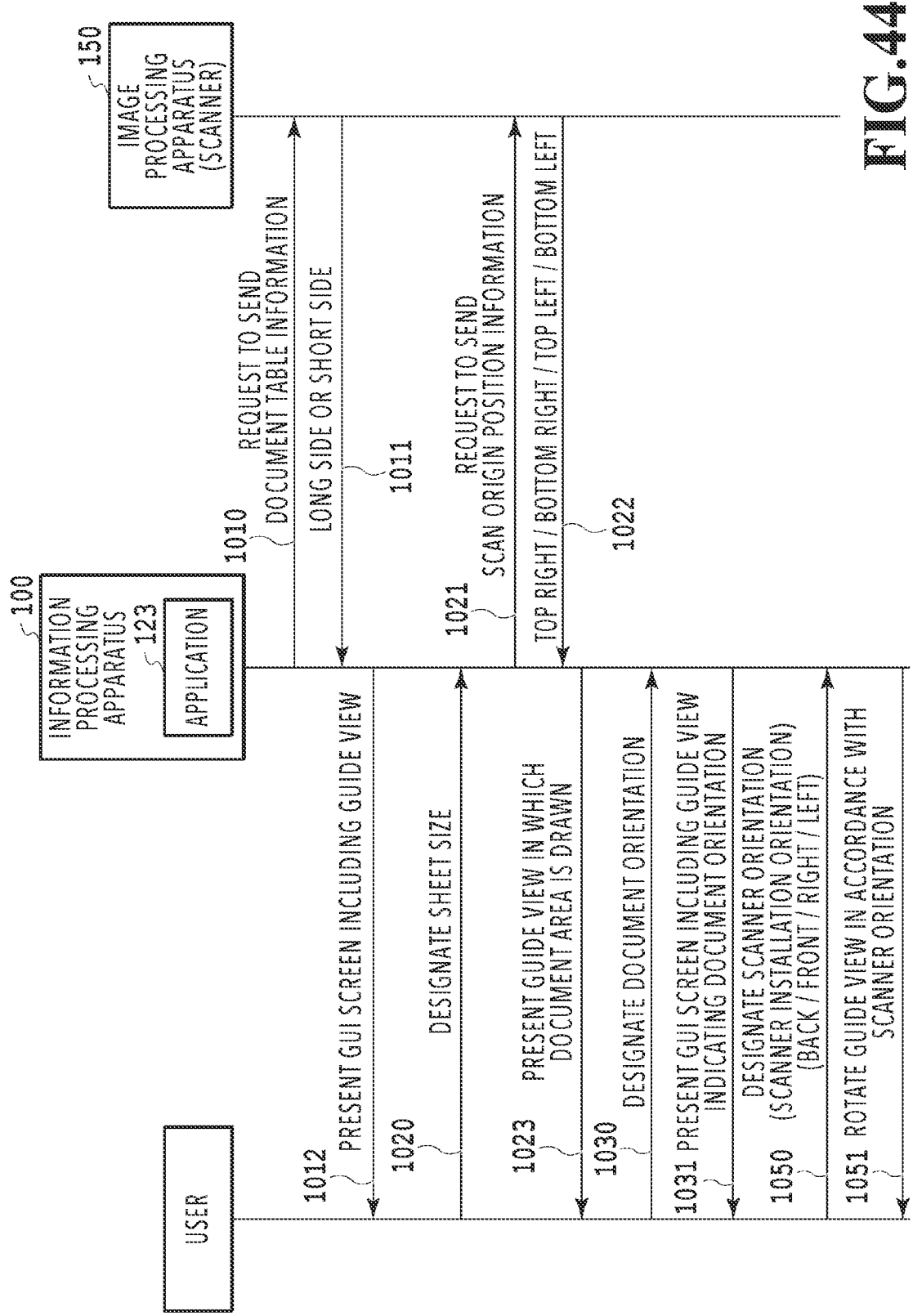
FIG. 44 is a sequence diagram of guide view display processing.

FIG. 44 is a sequence diagram of the guide view display processing accompanied by designation of scanner orientation in the present embodiment. Compared to the sequence diagram of the second embodiment (FIG. 34), S1010 to S1031 are the same but the sequence diagram of the present embodiment differs in further having S1050 and S1051.

At S1050, the CPU 103 of the information processing apparatus 100 obtains information indicating the scanner orientation designated by using the popup window 801 (see FIG. 40).

At S1051, the CPU 103 of the information processing apparatus 100 displays a GUI screen, on which the guide view 500 is rotated as needed, based on the scanner orientation information obtained at S1050. The rotation processing at this step will be explained by using FIG. 45.

Figure 45:
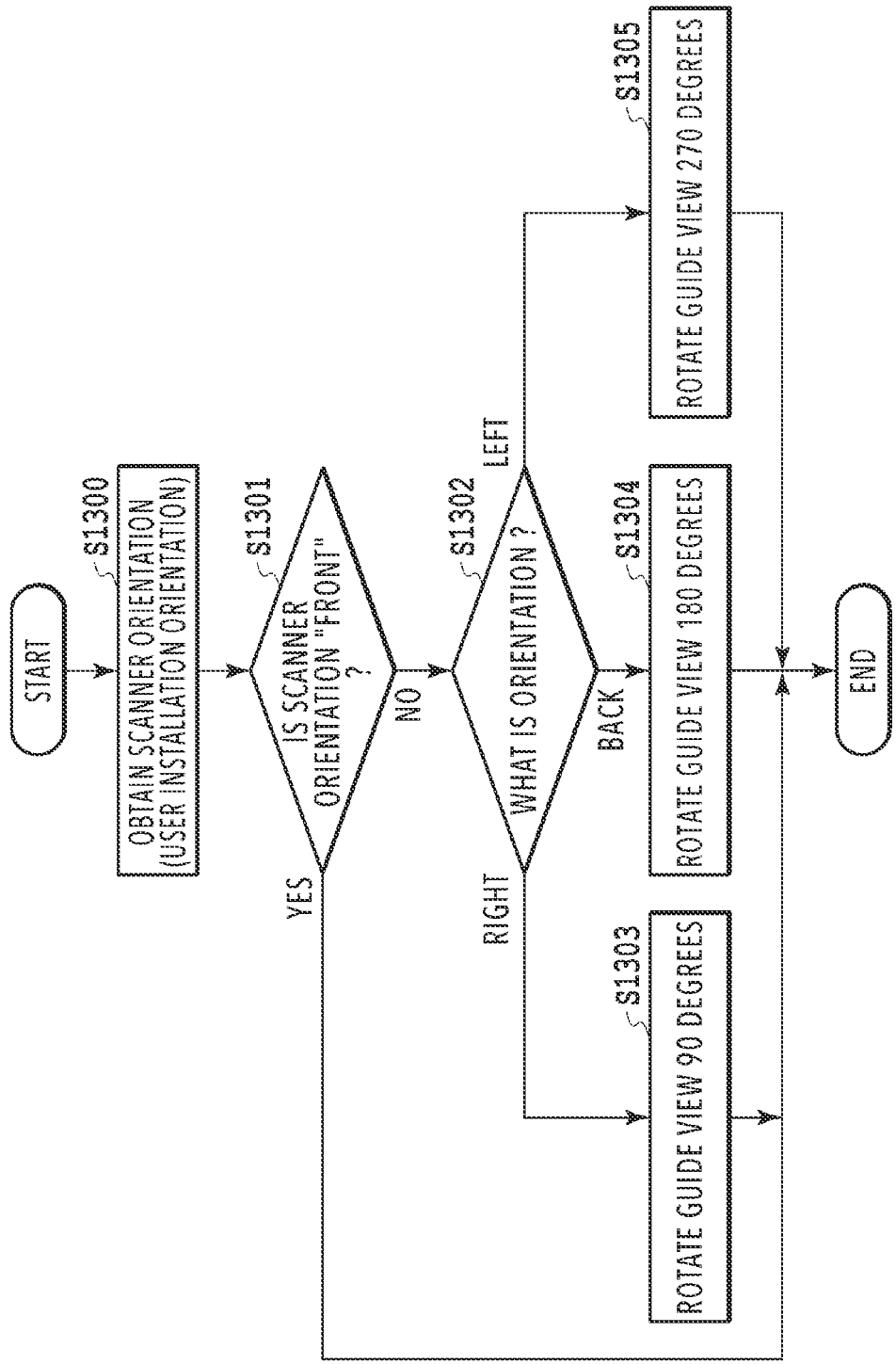
FIG. 45 is a flowchart of guide view display processing.

FIG. 45 is a flowchart showing processing in a case where the scanner orientation is changed. At S1300, the CPU 103 of the information processing apparatus 100 obtains information indicating the scanner orientation designated by a user. The information that is obtained at this step is the information received by the information processing apparatus 100 at S1050 (see FIG. 44).

At S1301, the CPU 103 of the information processing apparatus 100 determines whether the scanner orientation is "front" based on the information obtained at S1300. In a case where determination results at this step are affirmative, the series of processing is terminated and on the other hand, in a case where the determination results are negative (that is, in a case where the scanner orientation is "back", "right", or "left"), the processing advances to S1302.

At S1302, the CPU 103 of the information processing apparatus 100 determines which of "right", "back", and "left" the scanner orientation is based on the information obtained at S1300. In a case where determination results at this step indicate that the scanner orientation is "right", the processing advances to S1303, in a case where the determination results indicate that the scanner orientation is "back", the processing advances to S1304, and in a case where the determination results indicate that the scanner orientation is "left", the processing advances to S1305.

At S1303, the CPU 103 of the information processing apparatus 100 rotates 90 degrees and displays the guide view 500 in the scan window 400.

At S1304, the CPU 103 of the information processing apparatus 100 rotates 180 degrees and displays the guide view 500 in the scan window 400.

At S1305, the CPU 103 of the information processing apparatus 100 rotates 270 degrees and displays the guide view 500 in the scan window 400.

<Effects and the Like of the Present Embodiment>

In the present embodiment, the aspect is explained in which the guide view is rotated, but it may also be possible to change the display aspect of the document area in accordance with the rotation of the guide view. Further, in the present embodiment, the image, which is the guide view itself, is created and the created image is rotated. However, theoretically, it may also be possible to rewrite the information indicating the document table and the scan origin based on the information after the rotation and created the image, which is the guide view itself, based on the rewritten information.

According to the present embodiment, even in a case where the apparatus is installed in a way of placement, which is not the standard way of placement, it is made possible to implement a guide view in which the position at which a document is placed is presented to a user in an easy-to-see manner and by which it is possible to obtain a scanned image with a correct orientation on a GUI screen.

For example, the present embodiment is effective in a case where the vertically oriented SFS (scan origin is bottom left) whose standard way of placement is that the document cover is located on the "back" side is installed so that the document table cover 200 is located on the "left" side as shown in FIG. 38. In this case, by selecting the image 803 in the popup window 801 shown in FIG. 40, it is possible to continue the processing after this on the assumption that the document table is horizontally oriented and the scan origin is located at the bottom right.

It may also be possible to appropriately combine the contents of the embodiments described previously.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to present a user a document placement position by a simpler configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-097782, filed Jun. 11, 2021, which is hereby incorporated by reference wherein in its entirety.

What is claimed is:

1. A non-transitory computer readable storage medium storing a program that, when executed by a processor of an information processing apparatus that causes an image processing apparatus to perform document scan processing, causes the information processing apparatus to:
   create a GUI screen including information for guiding a position at which a document is placed on a document table of the image processing apparatus, wherein the GUI screen is created based on first information relating to the document table of the image processing apparatus, second information indicating a position of a scan origin on the document table, and third information indicating a document size designated by a user; and
   cause a display unit to display the created GUI screen.

2. The storage medium according to claim 1, wherein the program further causes the information processing apparatus to:
   obtain the first information;
   obtain the second information; and
   obtain the third information.

3. The storage medium according to claim 1, wherein the first information includes information on a size and an orientation of the document table.

4. The storage medium according to claim 1, wherein the GUI screen has a guide view for guiding a position at which the document is placed on the document table.

5. The storage medium according to claim 4, wherein in the guide view, a document table image representing an entire surface of the document table is displayed and on the document table image, a document area as an area in which the document is placed is displayed.

6. The storage medium according to claim 5, wherein the GUI screen further includes information to permit the user to designate the document size.

7. The storage medium according to claim 6, wherein based on a designation of the document size by the user, the size of the document area that is displayed on the document table image is determined.

8. The storage medium according to claim 6, wherein the GUI screen further includes information to permit the user to designate vertically oriented or horizontally oriented for the document orientation.

9. The storage medium according to claim 8, wherein based on a designation of the document orientation by the user, the orientation of the document area that is displayed on the document table image is determined.

10. The storage medium according to claim 9, wherein the information to permit the user to designate the document orientation includes a first image indicating vertically oriented and a second image indicating horizontally oriented,
    in each of the first image and the second image, an image indicating a document orientation is drawn, and
    in the document area, an image indicating a document orientation is drawn.

11. The storage medium according to claim 1, wherein the GUI screen includes information to permit the user to designate an orientation in which the image processing apparatus is placed.

12. The storage medium according to claim 11, wherein based on a designation of the orientation in which the image processing apparatus is placed, the orientation of the document table image in the guide view and the orientation of the document area on the document table image are determined.

13. An information processing apparatus that causes an image processing apparatus to perform document scan processing, the information processing apparatus comprising:
    at least one memory storing instructions; and
    at least one processor that, upon executing the stored instructions, performs the functions of:
    creating a GUI screen including information for guiding a position at which a document is placed on a document table of the image processing apparatus, wherein the GUI screen is created based on first information relating to the document table of the image processing apparatus, second information indicating a position of a scan origin on the document table, and third information indicating a document size designated by a user; and
    causing a display unit to display the created GUI screen.

14. A control method of a computer of an information processing apparatus that causes an image processing apparatus to perform document scan processing, the control method comprising:
    creating a GUI screen including information for guiding a position at which a document is placed on a document table of the image processing apparatus, wherein the GUI screen is created based on first information relating to the document table of the image processing apparatus, second information indicating a position of a scan origin on the document table, and third information indicating a document size designated by a user; and
    causing a display unit to display the created GUI screen.

* * * * *